Figure 1A:
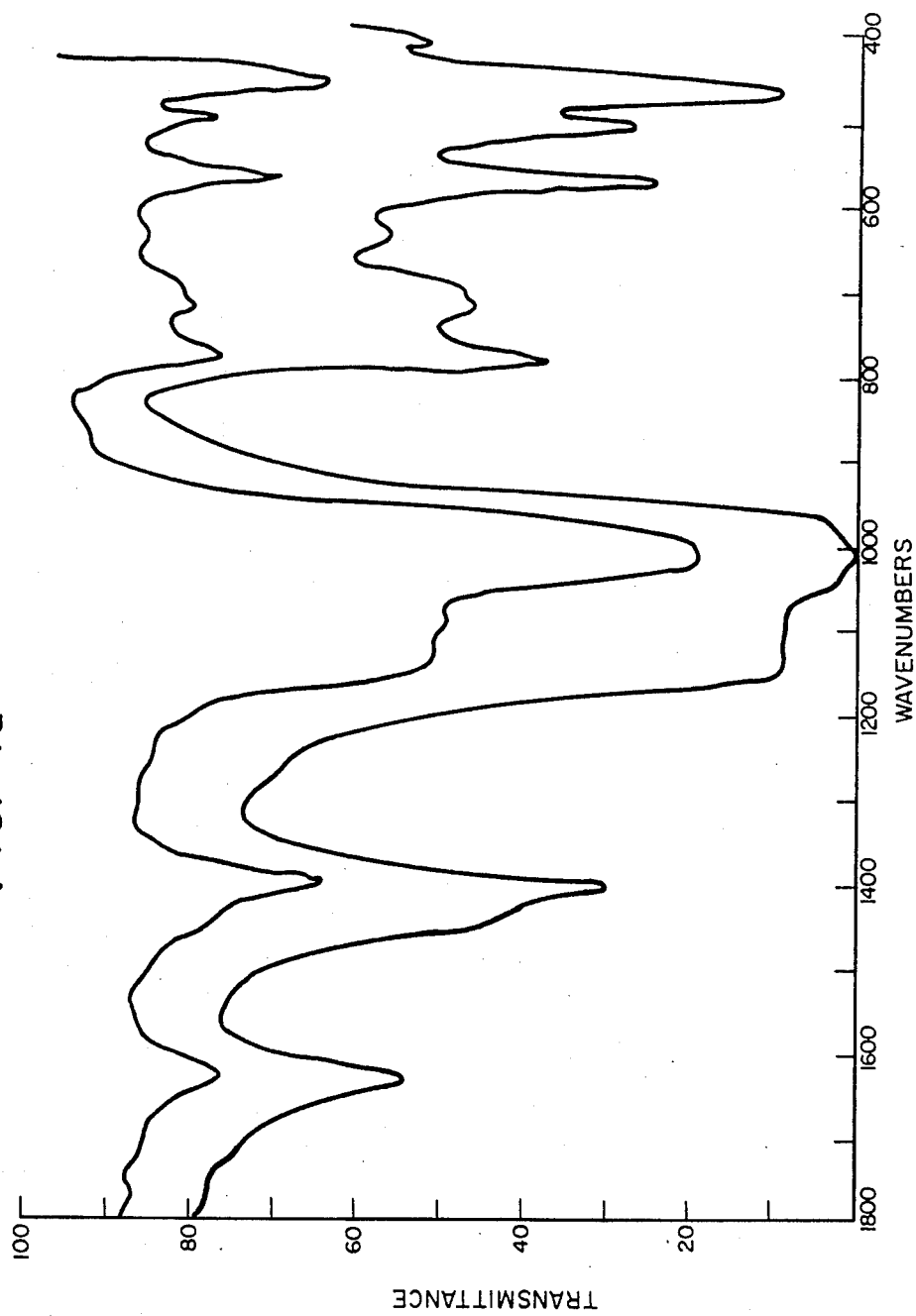

United States Patent [19]

Skeels et al.

[11] Patent Number: 4,610,856
[45] Date of Patent: Sep. 9, 1986

[54] SILICON SUBSTITUTED ZEOLITE COMPOSITIONS AND PROCESS FOR PREPARING SAME

[75] Inventors: Gary W. Skeels, Brewster; Donald W. Breck, deceased, late of White Plains; by Harold Blass, executor, Scarsdale, all of N.Y.

[73] Assignee: Union Carbide Corporation, Danbury, Conn.

[21] Appl. No.: 699,242

[22] Filed: Feb. 7, 1985

Related U.S. Application Data

[60] Division of Ser. No. 315,853, Oct. 28, 1981, Pat. No. 4,503,023, which is a continuation-in-part of Ser. No. 66,330, Aug. 14, 1979, abandoned.

[51] Int. Cl.[4] ............................................. C01B 33/28
[52] U.S. Cl. ..................................... 423/328; 502/60; 502/78; 502/79
[58] Field of Search ........................... 423/328; 502/78

[56] References Cited

U.S. PATENT DOCUMENTS

| 3,506,400 | 4/1970 | Eberly et al. | 423/328 |
| 3,551,353 | 12/1970 | Chen et al. | 423/328 |
| 3,597,155 | 8/1971 | Flanigen | 423/328 |
| 3,849,340 | 11/1974 | Pollitzer | 502/78 |
| 3,933,983 | 1/1976 | Elliott | 423/328 |
| 4,273,753 | 6/1981 | Chang | 423/328 |

Primary Examiner—John Doll
Assistant Examiner—Jackson Leeds
Attorney, Agent, or Firm—Richard G. Miller

[57] ABSTRACT

Aluminum from $AlO_4$-tetrahedra of as-synthesized zeolites is extracted and substituted with silicon to form zeolite compositions having higher $SiO_2/Al_2O_3$ molar ratios and exhibiting distinctive chemical and physical properties. The preparative procedure involves contact of the starting zeolite with an aqueous solution of a fluorosilicate salt using controlled proportions and temperature and pH conditions which avoid aluminum extraction without silicon substitution.

10 Claims, 3 Drawing Figures

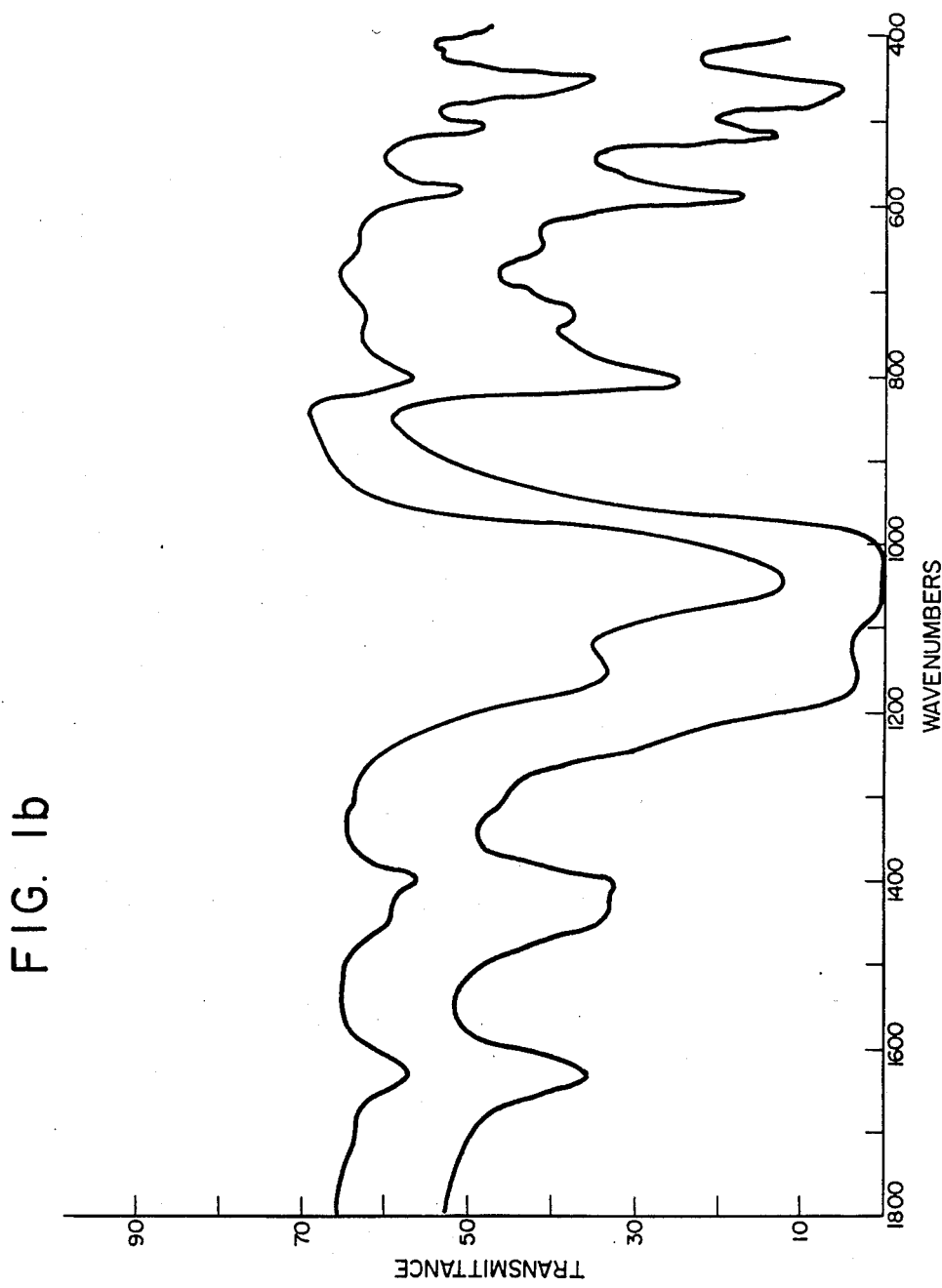

SILICON SUBSTITUTED ZEOLITE COMPOSITIONS AND PROCESS FOR PREPARING SAME

RELATED APPLICATIONS

This application is a division of prior U.S. application Ser. No. 315,853 filed Oct. 28, 1981, now U.S. Pat. No. 4,503,023, which is a continuation-in-part of application Ser. No. 066,330, now abandoned, filed Aug. 14, 1979.

The present invention relates in general to novel zeolite compositions and to the method for their preparation. More particularly it relates to zeolite compositions topologically related to prior known zeolites but which have substantially greater $SiO_2/Al_2O_3$ molar ratios than the heretofore known zeolite species and characterized by containing framework silicon atoms from an extraneous source, and preferably a very low content of defect sites in the structure. In general the preparative process involves contacting the starting zeolite under controlled conditions with an aqueous solution of a fluorosilicate salt, preferably one which does not form insoluble salts with aluminum.

The crystal structures of naturally occurring and as-synthesized zeoltic aluminosilicates are composed of $AlO_4^-$ and $SiO_4$ tetrahedra which are cross-linked by the sharing of oxygen atoms. The electrovalence of each tetrahedron containing an aluminum atom is balanced by association with a cation. Most commonly this cation is a metal cation such as $Na^+$ or $K^+$ but organic species such as quaternary ammonium ions are also employed in zeolite synthesis and in some instances appear as cations in the synthesized product zeolite. In general the metal cations are, to a considerable extent at least, replaceable with other cations including $H^+$ and $NH_4^+$. In many instances the organic cation species are too large to pass through the pore system of the zeolite and hence cannot be directly replaced by ion exchange techniques. Thermal treatments can reduce these organic cations to $H^+$ or $NH_4^+$ cations which can be directly ion-exchanged. Thermal treatment of the $H^+$ or $NH_4^+$ cationic forms of the zeolites can result in the substantial removal of these cations from their normal association with the $AlO_4^-$ tetrahedra thereby creating an electrovalent imbalance in the zeolite structure which must be accompanied by structural rearrangements to restore the electrovalent balance. Commonly when the $AlO_4^-$ tetrahedra constitue about 40% or more of the total framework tetrahedra, the necessary structural rearrangements cannot be accommodated and the crystal structure collapses. In more siliceous zeolites, the structural integrity is substantially maintained but the resulting "decationized" form has certain significantly different properties from its fully cationized precursor.

The relative instability of aluminum in zeolites, particularly in the non-metallic cationic or the decationized form, is well recognized in the art. For example, in U.S. Pat. No. 3,640,681, issued to P. E. Pickert on Feb. 3, 1972, there is disclosed a process for extracting framework aluminum from zeolites which involves dehydroxylating a partially cation deficient form of the zeolite and then contacting it with acetylacetone or a metal derivative thereof to chelate and solubilize aluminum atoms. Ethylenediaminetetraacetic acid has been proposed as an extractant for aluminum from a zeolite framework in a process which is in some respects similar to the Pickert process. It is also known that calcining the $H^+$ or $NH_4^+$ cation forms of zeolites such as zeolite Y in an environment of water vapor, either extraneous or derived from dehydroxylation of the zeolite itself, is effective in removing framework aluminum by hydrolysis. Evidence of this phenomenon is set forth in U.S. Pat. No. 3,506,400, issued Apr. 14, 1970 to P. E. Eberly, Jr. et al.; U.S. Pat. No. 3,493,519, issued Feb. 3, 1970 to G. T. Kerr et al.; and U.S. Pat. No. 3,513,108, issued May 19, 1970 to G. T. Kerr. In those instances in which the crystal structure of the product composition is retained after the rigorous hydrothermal treatment involved, infrared analysis indicated the presence of substantial hydroxyl groups exhibiting a stretching frequency in the area of about 3740, 3640 and 3550 cm$^{-1}$. The infrared analytical data of U.S. Pat. No. 3,506,400 is especially instructive in this regard. An explanation of the mechanism of the creation of these hydroxyl groups is provided by Kerr et al. in U.S. Pat. No. 3,493,519 wherein the patentees state that the aluminum atoms in the lattice framework of hydrogen zeolites can react with water resulting in the removal of aluminum from the lattice in accordance with the following equation:

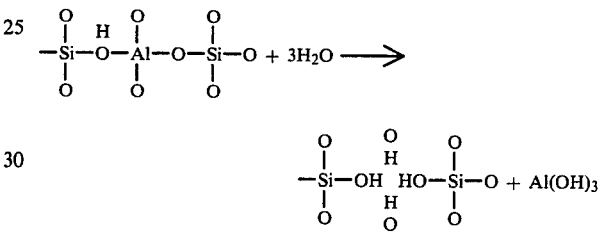

The aluminum removed from its original lattice position is capable of further reaction with cationic hydrogen, according to Kerr et al. to yield aluminum-containing i.e. hydroxoaluminum, cations by the equation:

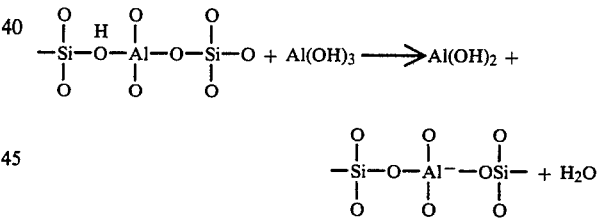

It has been suggested that stabilization of NH$_4$Y occurs through hydrolysis of sufficient framework aluminum to form stable clusters of these hydroxoaluminum cations within the sodalite cages, thereby holding the zeolite structure together while the framework anneals itself through the migration of some of the framework silicon atoms.

It is alleged in U.S. Pat. No. 3,594,331, issued July 20, 1971 to C. H. Elliott, that fluoride ions in aqueous media, particularly under conditions in which the pH is less than about 7, are quite effective in extracting framework aluminum from zeolite lattices, and in fact when the fluoride concentration exceeds about 15 grams active fluoride per 10,000 grams of zeolite, destruction of the crystal lattice by the direct attack on the framework silicon as well as on the framework aluminum, can result. A fluoride treatment of this type using from 2 to 22 grams of available fluoride per 10,000 grams of zeolite (anhydrous) in which the fluorine is provided by ammonium fluorosilicate is also described therein. The treatment is carried out for the purpose of improving the thermal stability of the zeolite. It is theorized by the patentee that the fluoride in some manner becomes attached to the constructional alkali metal oxide, thereby reducing the fluxing action of the basic structural Na$_2$O which would otherwise result in the collapse of the crystal structure. Such treatment within the constraints of the patent disclosure has no effect on either the overall silicon content of the zeolite product or the silicon content of a unit cell of the zeolite.

Since stability quite obviously is, in part at least, a function of the SiO$_2$/Al$_2$O$_3$ ratio of zeolites, it would appear to be advantageous to obtain zeolites having higher proportions of SiO$_4$ tetrahedra by direct synthesis techniques and thereby avoid the structural changes inherent in framework aluminum extraction. Despite considerable effort in this regard, however, only very modest success has been achieved, and this as applied to a few individual species only. For example, over the seventeen year period since zeolite Y was first made known to the public as a species having an as-synthesized SiO$_2$/Al$_2$O$_3$ molar ratio of 3 to 6, the highest SiO$_2$/Al$_2$O$_3$ value alleged for an as-synthesized zeolite having the Y structure to date is 7.8 (Netherlands Pat. No. 7306078).

We have now discovered, however, a method for removing framework aluminum from zeolites having SiO$_2$/Al$_2$O$_3$ molar ratios of about 3 or greater and substituting therefor silicon from a source extraneous to the starting zeolite. By this procedure it is possible to create more highly siliceous zeolite species which have the same crystal structure as would result by direct synthesis if such synthesis method were known. In general the process comprises contacting a crystalline zeolite having pore diameters of at least about 3 Angstroms and having a molar SiO$_2$/Al$_2$O$_3$ ratio of at least 3, with a fluorosilicate salt, preferably in an amount of at least 0.0075 moles per 100 grams of zeolite starting material, said fluorosilicate salt being in the form of an aqueous solution having a pH value in the range of 3 to about 7, preferably 5 to about 7, and brought into contact with the zeolite either incrementally or continuously at a slow rate whereby framework aluminum atoms of the zeolite are removed and replaced by extraneous silicon atoms from the added fluorosilicate. It is desirable that the process is carried out such that at least 60, preferably at least 80, and most preferably at least 90, percent of the crystal structure of the starting zeolite is retained and the Defect Structure Factor is less than 0.08, and preferably less than 0.05 as defined hereinafter.

The crystalline zeolite starting materials suitable for the practice of the present invention can be any of the well known naturally occurring or synthetically produced zeolite species which have pores large enough to permit the passage of water, fluorosilicate reagents and reaction products through their internal cavity system. These materials can be represented, in terms of molar ratios of oxides, as M$_{2/n}$O:Al$_2$O$_3$:xSiO$_2$:yH$_2$O wherein "M" is a cation having the valence "n", "x" is a value of at least about 3 and "y" has a value of from zero to about 9 depending upon the degree of hydration and the capacity of the particular zeolite to hold adsorbed water. Alternatively, the framework composition can be expressed as the mole fraction of framework tetrahedra, TO$_2$, as:

(Al$_a$Si$_b$)O$_2$ wherein "a" is the fraction of framework tetrahedral sites occupied by aluminum atoms and "b" is the fraction of framework tetrahedral sites occupied by silicon atoms. The algebraic sum of all of the subscripts within the brackets is equal to 1. In the above example, a+b=1.

For reasons more fully explained hereinafter, it is necessary that the starting zeolite be able to withstand the initial loss of framework aluminum atoms to at least a modest degree without collapse of the crystal structure unless the process is to be carried out at a very slow pace. In general the ability to withstand aluminum extraction and maintain a high level of crystallinity is directly proportional to the initial SiO$_2$/Al$_2$O$_3$ molar ratio of the zeolite. Accordingly it is preferred that the value for "x" in the formula above be at least about 3, and more preferably at least about 3.5. Also it is preferred that at least about 50, and more preferably at least 95%, of the AlO$_4$ tetrahedra of the naturally occurring or as-synthesized zeolite are present in the starting zeolite. Most advantageously the starting zeolite contains as many as possible of its original AlO$_4$ tetrahedra, i.e. has not been subjected to any post-formation treatment which either extensively removes aluminum atoms from their original framework sites or converts them from the normal conditions of 4-fold coordination with oxygen.

The cation population of the starting zeolite is not a critical factor insofar as substitution of silicon for framework aluminum is concerned, but since the substitution mechanism involves the in situ formation of salts of at least some of the zeolitic cations, it is advantageous that these salts be water-soluble to a substantial degree to facilitate their removal from the silica-enriched zeolite product. It is found that ammonium cations form the most soluble salt in this regard and it is accordingly preferred that at least 50 percent, most preferably 85 or more percent, of the zeolite cations be ammonium cations. Sodium and potassium, two of the most common original cations in zeolites are found to form Na$_3$AlF$_6$ and K$_3$AlF$_6$ respectively, both of which are only very sparingly soluble in either hot or cold water. When these compounds are formed as precipitates within the structural cavities of the zeolite they are quite difficult to remove by water washing. Their removal, moreover, is important if thermal stability of the zeolite product is desired since the substantial amounts of fluoride can cause crystal collapse at temperatures as low as 500° C.

The naturally-occurring or synthetic zeolites used as starting materials in the present process are compositions well-known in the art. A comprehensive review of the structure, properties and chemical compositions of crystalline zeolites is contained in Breck, D. W., "Zeolite Molecular Sieves," Wiley, New York, 1974, and incorporated herein by reference. In those instances in which it is desirable to replace original zeolitic cations for others more preferred in the present process, conventional ion-exchange techniques are suitably employed. Especially preferred zeolite species are zeolite Y, zeolite rho, zeolite W, zeolite N-A, zeolite L, and the mineral and synthetic analogs of mordenite clinoptilolite, chabazite, offretite and erionite. The fluorosilicate salt used as the aluminum extractant and also as the source of extraneous silicon which is inserted into the zeolite structure in place of the extracted aluminum can be any of the fluorosilicate salts having the general formula $$(A)_{2/b}SiF_6$$

wherein A is a metallic or non-metallic cation other than $H^+$ having the valence "b". Cations represented by "A" are alkylammonium, $NH_4^+$, $Mg^{++}$, $Li^+$, $Na^+$, $K^+$, $Ba^{++}$, $Cd^{++}$, $Cu^+$, $H^+$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$ and $Zn^{++}$. The ammonium cation form of the fluorosilicate is highly preferred because of its substantial solubility in water and also because the ammonium cations form water soluble by-product salts upon reaction with the zeolite, namely $(NH_4)_3AlF_6$.

In certain respects, the manner in which the fluorosilicate and starting zeolite are brought into contact and reacted is of critical importance. We have discovered that the overall process of substituting silicon for aluminum in the zeolite framework is a two step process in which the aluminum extraction step will, unless controlled, proceed very rapidly while the silicon insertion is relatively very slow. If dealumination becomes too extensive without silicon substitution, the crystal structure becomes seriously degraded and ultimately collapses. While we do not wish to be bound by any particular theory, it appears that the fluoride ion is the agent for the extraction of framework aluminum in accordance with the equation.

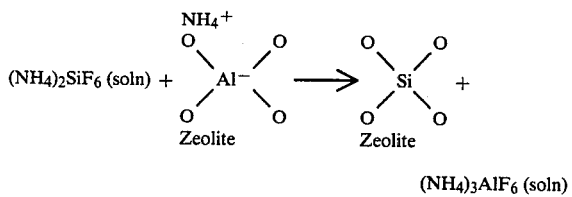

It is, therefore, essential that the initial dealumination step be inhibited and the silicon insertion step be promoted to achieve the desired zeolite product. It is found that the various zeolite species have varying degrees of resistance toward degradation as a consequence of framework aluminum extraction without silicon substitution. In general the rate of aluminum extraction is decreased as the pH of the fluorosilicon solution in contact with the zeolite is increased within the range of 3 to 7, and as the concentration of the fluorosilicate in the reaction system is decreased. Also increasing the reaction temperature tends to increase the rate of silicon substitution. Whether it is necessary or desirable to buffer the reaction system or strictly limit the fluorosilicate concentration is readily determined for each zeolite species by routine observation.

Theoretically, there is no lower limit for the concentration of fluorosilicate salt in the aqueous solution employed, provided of course the pH of the solution is high enough to avoid undue destructive acidic attack on the zeolite structure apart from the intended reaction with the fluorosilicate. Very slow rates of addition of fluorosilicate salts insure that adequate time is permitted for the insertion of silicon as a framework substitute for extracted aluminum before excessive aluminum extraction occurs with consequent collapse of the crystal structure. Practical commercial considerations, however, require that the reaction proceed as rapidly as possible, and accordingly the conditions of reaction temperature and reagent concentrations should be optimized with respect to each zeolite starting material. In general the more highly siliceous the zeolite, the higher the permissible reaction temperature and the lower the suitable pH conditions. In general the preferred reaction temperature is within the range of 50° to 95° C., but temperatures as high as 125° C. and as low as 20° C. have been suitably employed in some instances. At pH values below about 3 crystal degradation is generally found to be unduly severe, whereas at pH values higher than 7, silicon insertion is unduly low. The maximum concentration of fluorosilicate salt in the aqueous solution employed is, of course, interdependent with the temperature and pH factors and also with the time of contact between the zeolite and the solution and the relative proportions of zeolite and fluorosilicate. Accordingly it is possible that solutions having fluorosilicate concentrations of from about $10^{-3}$ moles per liter of solution up to saturation can be employed, but it is preferred that concentrations in the range of 0.5 to 1.0 moles per liter of solution be used. These concentration values are with respect to true solutions, and are not intended to apply to the total fluorosilicate in slurries of salts in water. As illustrated hereinafter, even very slightly soluble fluorosilicates can be slurried in water and used as a reagent—the undissolved solids being readily available to replace dissolved molecular species consumed in reaction with the zeolite. As stated hereinabove, the amount of dissolved fluorosilicate employed with respect to the particular zeolite being treated will depend to some extent upon the physical and chemical properties of the individual zeolites as well as other specifications herein contained in this application. However, the minimum value for the amount of fluorosilicate to be added should be at least equivalent to the minimum mole fraction of aluminum to be removed from the zeolite.

In this disclosure, including the appended claims, in specifying proportions of zeolite starting material or adsorption properties of the zeolite product, and the like, the anhydrous state of the zeolite will be intended unless otherwise stated. The anhydrous state is considered to be that obtained by heating the zeolite in dry air at 450° C. for 4 hours.

It is apparent from the foregoing that, with respect to reaction conditions, it is desirable that the integrity of the zeolite crystal structure is substantially maintained throughout the process, and that in addition to having extraneous (non-zeolitic) silicon atoms inserted into the lattice, the zeolite retains at least 60 and preferably at least 90 percent of its original crystallinity. A convenient technique for assessing the crystallinity of the products relative to the crystallinity of the starting material is the comparison of the relative intensities of the d-spacings of their respective X-ray powder diffraction patterns. The sum of the peak heights, in terms of arbitrary units above background, of the starting material is used as the standard and is compared with the corresponding peak heights of the products. When, for example, the numerical sum of the peak heights of the product is 85 percent of the value of the sum of the peak heights of the starting zeolite, then 85 percent of the crystallinity has been retained. In practice it is common to utilize only a portion of the d-spacing peaks for this purpose, as for example, five of the six strongest d-spacings. In zeolite Y these d-spacings correspond to the Miller Indices 331, 440, 533, 642 and 555. Other indicia of the crystallinity retained by the zeolite product are the degree of retention of surface area and the degree of retention of the adsorption capacity. Surface areas can be determined by the well-known Brunauer-Emmett-Teller method (B-E-T). J. Am. Chem. Soc. 60 309 (1938) using nitrogen as the adsorbate. In determining the adsorption capacity, the capacity for oxygen at −183° C. at 100 Torr is preferred.

All available evidence indicates that the present process is unique in being able to produce zeolites essentially free of defect structure yet having molar $SiO_2/Al_2O_3$ ratios higher than can be obtained by direct hydrothermal synthesis. The products resulting from the operation of the process share the common characteristic of having a higher molar $SiO_2/Al_2O_3$ ratio than previously obtained for each species by direct hydrothermal synthesis by virtue of containing silicon from an extraneous, i.e. non-zeolitic, source, preferably in conjunction with a crystal structure which is characterized as containing a low level of tetrahedral defect sites. This defect structure, if present, is revealed by the infrared spectrum of zeolites in the hydroxyl-stretching region.

In untreated, i.e. naturally occurring or as-synthesized zeolites the original tetrahedral structure is conventionally represented as

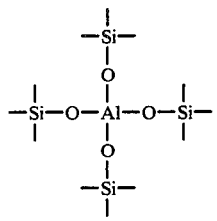

After treatment with a complexing agent such as ethylenediaminetetraacetic acid ($H_4EDTA$) in which a stoichiometric reaction occurs whereby framework aluminum atoms along with an associated cation such as sodium is removed as NaAlEDTA, it is postulated that the tetrahedral aluminum is replaced by four protons which form a hydroxyl "nest", as follows:

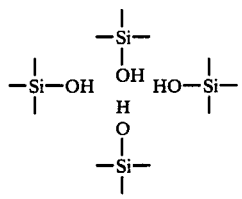

The infrared spectrum of the aluminum depleted zeolite will show a broad nondescript absorption band beginning at about 3750 cm$^{-1}$ and extending to about 3000 cm$^{-1}$. The size of this absorption band or envelope increases with increasing aluminum depletion of the zeolite. The reason that the absorption band is so broad and without any specific absorption frequency is that the hydroxyl groups in the vacant sites in the framework are coordinated in such a way that they interact with each other (hydrogen bonding). The hydroxyl groups of adsorbed water molecules are also hydrogen-bonded and produce a similar broad absorption band as do the "nest" hydroxyls. Also, certain other zeolitic hydroxyl groups, exhibiting specific characteristic absorption frequencies within the range of interest, will if present, cause infrared absorption bands in these regions which are superimposed on the band attributable to the "nest" hydroxyl groups. These specific hydroxyls are created by the decomposition of ammonium cations or organic cations present in the zeolite.

It is, however, possible to treat zeolites, prior to subjecting them to infrared analysis, to avoid the presence of the interferring hydroxyl groups and thus be able to observe the absorption attributable to the "nest" hydroxyls only. The hydroxyls belonging to adsorbed water are avoided by subjecting the hydrated zeolite sample to vacuum activation at a moderate temperature of about 200° C. for about 1 hour. This treatment permits desorption and removal of the adsorbed water. Complete removal of adsorbed water can be ascertained by noting when the infrared absorption band at about 1640 cm$^{-1}$, the bending frequency of water molecules, has been removed from the spectrum.

The decomposable ammonium cations can be removed, at least in large part, by ion-exchange and replaced with metal cations, preferably by subjecting the ammonium form of the zeolite to a mild ion exchange treatment with an aqueous NaCl solution. The OH absorption bands produced by the thermal decomposition of ammonium cations are thereby avoided. Accordingly the absorption band over the range of 3745 cm$^{-1}$ to about 3000 cm$^{-1}$ for a zeolite so treated is almost entirely attributable to hydroxyl groups associated with defect structure and the absolute absorbance of this band can be a measure of the degree of aluminum depletion.

It is found, however, that the ion-exchange treatment, which must necessarily be exhaustive even though mild, requires considerable time. Also the combination of the ion-exchange and the vacuum calcination to remove adsorbed water does not remove every possible hydroxyl other than defect hydroxyls which can exhibit absorption in the 3745 cm$^{-1}$ to 3000 cm$^{-1}$ range. For instance, a rather sharp band at 3745 cm$^{-1}$ has been attributed to the Si—OH groups situated in the terminal lattice positions of the zeolite crystals and to amorphous (non-zeolitic) silica from which physically adsorbed water has been removed. For these reasons we prefer to use a somewhat different criterion to measure the degree of defect structure in the zeolite products of this invention.

In the absence of hydrogen-bonded hydroxyl groups contributed by physically adsorbed water, the absorption frequency least affected by absorption due to hydroxyl groups other than those associated with framework vacancies or defect sites is at 3710±5 cm$^{-1}$. Thus the relative number of defect sites remaining in a zeolite product of this invention can be gauged by first removing any adsorbed water from the zeolite, determining the value of the absolute absorbance in its infrared spectrum at a frequency of 3710 cm$^{-1}$, and comparing that value with the corresponding value obtained from the spectrum of a zeolite having a known quantity of defect structure. The following specific procedure has been arbitrarily selected and used to measure the amount of defect structure in the products prepared in the Examples appearing hereinafter. Using the data obtained from this procedure it is possible, using simple mathematical calculation, to obtain a single and reproducible value hereinafter referred to as the "Defect Structure Factor", denoted hereinafter by the symbol "z", which can be used in comparing and distinguishing the present novel zeolite compositions from their less-siliceous prior known counterparts and also with equally siliceous prior known counterparts prepared by other techniques.

DEFECT STRUCTURE FACTOR (A) Defect Structure Zeolite Standard.

Standards with known amounts of defect structure can be prepared by treating a crystalline zeolite of the same species as the product sample with ethylenediaminetetraacetic acid by the standard procedure of Kerr as described in U.S. Pat. No. 3,442,795. In order to prepare the standard it is important that the starting zeolite be well crystallized, substantially pure and free from defect structure. The first two of these properties are readily determined by conventional X-ray analysis and the third by infrared analysis using the procedure set forth in part (B) hereof. The product of the aluminum extraction should also be well crystallized and substantially free from impurities. The amount of aluminum depletion, i.e., the mole fraction of tetrahedral defect structure of the standard samples can be ascertained by conventional chemical analytical procedure. The molar $SiO_2/Al_2O_3$ ratio of the starting zeolite used to prepare the standard sample in any given case is not narrowly critical, but is preferably within about 10% of the molar $SiO_2/Al_2O_3$ ratio of the same zeolite species used as the starting material in the practice of the process of the present invention.

(B) Infrared Spectrum of Product Sample and Defect Structure Zeolite Standard.

Fifteen milligrams of the hydrated zeolite to be analyzed are pressed into a 13 mm. diameter self-supporting wafer in a KBr die under 5000 lbs. pressure. The wafer is then heated at 200° C. for 1 hour at a pressure of not greater than $1 \times 10^{-4}$ mm. Hg to remove all observable traces of physically adsorbed water from the zeolite. This condition of the zeolite is evidenced by the total absence of an infrared absorption band at 1640 $cm^{-1}$. Thereafter, and without contact with adsorbable substances, particularly water vapor, the infrared spectrum of the wafer is obtained on an interferometer system at 4 $cm^{-1}$ resolution over the frequency range of 3745 to 3000 $cm^{-1}$. Both the product sample and the standard sample are analyzed using the same interferometer system to avoid discrepancies in the analysis due to different apparatus. The spectrum, normally obtained in the transmission mode of operation is mathematically converted to and plotted as wave number vs. absorbance.

(C) Determination of the Defect Structure Factor.

The defect structure factor (z) is calculated by substituting the appropriate data into the following formula:

$$z = \frac{AA_{(ps)} \times \text{(Mole fraction of defects in the standard)}}{AA_{(std)}}$$

wherein $AA_{(ps)}$ is the infrared absolute absorbance measured above the estimated background of the product sample at 3710 $cm^{-1}$; $AA_{(std)}$ is the absolute absorbance measured above the background of the standard at 3710 $cm^{-1}$ and the mole fraction of defects in the standard are determined in accordance with part (A) above.

Once the defect structure factor, z, is known, it is possible to determine from wet chemical analysis of the product sample for $SiO_2$, $Al_2O_3$ and the cation content as $M_{2/n}O$ whether silicon has been substituted for aluminum in the zeolite as a result of the treatment and also the efficiency of any such silicon substitution.

For purposes of simplifying these determinations, the framework compositions are best expressed in terms of mole fractions of framework tetrahedra $TO_2$. The starting zeolite may be expressed as:

$$(Al_a Si_b \square_z)O_2$$

whereas "a" is the mole fraction of aluminum tetrahedra in the framework; "b" is the mole fraction of silicon tetrahedra in the framework; $\square$ denotes defect sites and "z" is the mole fraction of defect sites in the zeolite framework. In many cases the "z" value for the starting zeolite is zero and the defect sites are simply eliminated from the expression. Numerically the sum of the values $a+b+z=1$.

The zeolite product of the fluorosilicate treatment, expressed in terms of mole fraction of framework tetrahedra ($TO_2$) will have the form $$[Al_{(a-N)} Si_{b+(N-\Delta z)} \square_z] O_2$$

wherein: "N" is defined as the mole fraction of aluminum tetrahedra removed from the framework during the treatment; "a" is the mole fraction of aluminum tetrahedra present in the framework of the starting zeolite; "b" is the mole fraction of silicon tetrahedra present in the framework of the starting zeolite; "z" is the mole fraction of defect sites in the framework; (N-$\Delta z$) is the mole fraction increase in silicon tetrahedra resulting from the fluorosilicate treatment; "$\Delta z$" is the net change in the mole fraction of defect sites in the zeolite framework resulting from the treatment $$\Delta z = z \text{ (product zeolite)} - z \text{ (starting zeolite)}$$

The term Defect Structure Factor for any given zeolite is equivalent to the "z" value of the zeolite. The net change in Defect Structure Factors between the starting zeolite and the product zeolite is equivalent to "$\Delta z$". Numerically, the sum of the values:

$$(a-N)+[b+(N-\Delta z)]+z=1$$

The fact that the present process results in zeolite products having silicon substituted for aluminum in the framework is substantiated by the framework infrared spectrum in addition to the hydroxyl region infrared spectrum. In the former, there is a shift to higher wave numbers of the indicative peaks and some sharpening thereof in the case of the present products, as compared to the starting zeolite, which is due to an increased $SiO_2/Al_2O_3$ molar ratio.

The essential X-ray powder diffraction patterns appearing in this specification and referred to in the appended claims are obtained using standard X-ray powder diffraction techniques. The radiation source is a high-intensity, copper target, X-ray tube operated at 50 Kv and 40 ma. The diffraction pattern from the copper K$\alpha$ radiation and graphite monochromator is suitably recorded by an X-ray spectrometer scintillation counter, pulse-height analyzer and strip-chart recorder. Flat compressed powder samples are scanned at 2° (2 theta) per minute, using a 2 second time constant. Interplanar spacings (d) are obtained from the position of the diffraction peaks expressed as 2$\theta$, where $\theta$ is the Bragg angle as observed on the strip chart. Intensities are determined from the heights of diffraction peaks after substracting background.

In determining the cation equivalency, i.e. the molar ratio $M_{2/n}O/Al_2O_3$, in each zeolite product, it is advantageous to perform the routine chemical analysis on a form of the zeolite in which "M" is a monovalent cation other than hydrogen. This avoids the uncertainty which can arise in the case of divalent or polyvalent metal zeolite cations as to whether the full valence of the cation is employed in balancing the net negative charge associated with each $AlO_4$-tetrahedron or whether some of the positive valence of the cation is used in bonding with $OH^-$ or $H_3O^+$ ions.

The preferred novel crystalline aluminosilicate compositions of the present invention will contain a chemical or molar framework composition which can be determined from the expression of mole fractions of framework tetrahedra previously described;

$$[Al_{(a-N)}Si_{b+(N-\Delta z)}\square_z]O_2$$

wherein: the framework Si/Al ratio is determined by $$\frac{b + N - \Delta z}{a - N}$$

and is numerically $\geq 4$; the mole fraction of the aluminum tetrahedra removed from the framework of the starting zeolite, N, is $\geq 0.3a$, the mole fraction of silicon tetrahedra substituted into the framework of the product zeolite $(N-\Delta z)$ is increased by at least a value for $$\frac{N - \Delta z}{N}$$

which is numerically $\geq 0.5$, the change in Defect Structure Factor $\Delta z$ is increased by less than 0.08 and preferably less than 0.05.

Moreover, regardless of the Defect Structure Factor of any zeolite material which has been treated according to the present process, it is novel by virtue of having had extraneous silicon inserted into its crystal lattice and having a molar $SiO_2/Al_2O_3$ ratio greater than heretofore obtained by direct hydrothermal synthesis. This is necessarily the case since all other methods for increasing the $SiO_2/Al_2O_3$ ratio of a zeolite crystal must remove framework aluminum atoms, and unless at least one of those removed aluminum atoms is replaced by a silicon atom from a source other than the crystal itself, the absolute defect structure content of the crystal must be greater than the product of the present invention.

Crystal structures are more commonly described in terms of the number of tetrahedra in a unit cell. The unit cell is the basic structural unit that is repeated throughout the crystal. The number of tetrahedra in a unit cell vary widely among the various zeolite species, however. For example, the unit cell of offretite contains only 18 tetrahedra whereas the unit cell of faujasite or a Y-type zeolite contains 192 tetrahedra. Hence the substitution of one extraneous silicon atom for one framework aluminum atom in each unit cell of offretite has a disproportionately larger effect than the same single atom substitution per unit cell of faujasite. This substantial disparity can be ameliorated to a considerable degree by regarding the framework substitutions as changes in the framework density of the zeolites involved, which can be expressed as the number of framework tetrahedra per $10,000Å^3$. Most zeolites have a framework density of from about 130 to 190 tetrahedra per $10,000Å^3$. A more detailed description of framework density has been published by W. M. Meier, "Proceedings of the Conference on Molecular Sieve (London, April 1967)," Society of Chemical Industry, (1968) pg. 19 et seq. This publication is incorporated herein by reference.

Accordingly, the novel crystalline aluminosilicates of the present invention include:

Zeolite LZ-210 having, in the dehydrated state, a chemical composition expressed in terms of mole ratios of oxides as $$(0.85 - 1.1)M_{2/n}O:Al_2O_3:xSiO_2$$

wherein "M" is a cation having the valence "n" and "x" is a value greater than 8, preferably greater than 9 more preferably and within the range of 9 to 60, having an X-ray powder diffraction pattern having at least the d-spacings set forth in Table A, below, and having extraneous silicon atoms in its crystal lattice in the form of $SiO_4$ tetrahedra, preferably in an average amount of at least 1.0 per $10,000Å^3$.

A more limited subclass of LZ-210 compositions, i.e. those which are characterized by having both high molar $SiO_2/Al_2O_3$ ratios and low Defect Structure Factors, can be defined as having a chemical composition expressed in terms of mole fractions of framework tetrahedra as:

$$[Al_{(a-N)}Si_{b+(N-\Delta z)}\square_z]O_2$$

wherein: the mole fraction of aluminum —N— removed from the framework of the starting zeolite is at least $0.03a$;

$$\frac{b + N - \Delta z}{a - N}$$

has a value $\geq 4$ and preferably greater than 4.5; the change in defect structure factor $\Delta z$ is less than 0.08 and preferably less than 0.05; an increased silicon content in the framework, A $$\frac{N - \Delta z}{N},$$

of at least 0.5; and a cation equivalent expressed as a monovalent cation species, $M^+/Al$, from 0.85 to 1.1 and the characteristic crystal structure of zeolite Y as indicated by an X-ray powder diffraction pattern having at least the d-spacings set forth broadly in Table A, and more narrowly in Table B, below.

TABLE A

| d(Å) | Intensity |
|---|---|
| 14.17–13.97 | very strong |
| 8.68–8.55 | medium |
| 7.40–7.30 | medium |
| 5.63–5.55 | strong |
| 4.72–4.66 | medium |
| 4.34–4.28 | medium |
| 3.74–3.69 | strong |
| 3.28–3.23 | strong |
| 2.83–2.79 | strong |

TABLE B

| d(A) | Intensity |
|---|---|
| 14.17–14.09 | very strong |
| 8.68–8.62 | medium |
| 7.40–7.35 | medium |
| 5.63–5.59 | strong |
| 4.72–4.69 | medium |
| 4.34–4.31 | medium |
| 3.74–3.72 | strong |
| 3.28–3.26 | strong |
| 2.83–2.81 | strong |

The LZ-210 zeolite as defined above will have a cubic unit cell dimension, $a_o$, of less than 24.55 Angstroms, preferably from 24.20 to 24.55 Angstroms and, when the molar $SiO_2/Al_2O_3$ ratio is less than 20, an adsorption capacity for water vapor at 25° C. and 4.6 Torr water vapor pressure of at least 20 weight percent based on the anhydrous weight of the zeolite, and preferably an oxygen adsorption capacity at 100 Torr and −183° C. of at least 25 weight percent.

LZ-210 can be prepared from a conventionally prepared zeolite Y which has a molar $SiO_2/Al_2O_3$ ratio of less than 8 by using the present process to increase the $SiO_2/Al_2O_3$ ratio greater than 8. A preferred procedure is the process embodiment which comprises.

(a) providing a zeolite Y composition having a molar $SiO_2/Al_2O_3$ ratio of not greater than 7, preferably between 3 to 6;

(b) contacting and reacting at a temperature of from 20° to 95° C., said zeolite Y with a fluorosilicate, preferably ammonium fluorosilicate, in an amount of at least as great as the value "N", defined supra, wherein "N" is equal to or greater than 0.3a.

It can also be stated that:

$$AFS = 1.395a - 0.275$$

wherein AFS is the minimum number of moles of ammonium fluorosilicate per 100 gm (anhydrous weight) of zeolite starting material and "a" is the mole fraction of framework aluminum atoms in the zeolite starting material as stated in $(Al_aSi_b\square_z)O_2$, said fluorosilicate being in the form of an aqueous solution at a pH in the range of 5 to about 7, the fluorosilicate solution being brought into contact with the zeolite either incrementally or continuously at a slow rate such that a sufficient proportion of the framework aluminum atoms removed are replaced by silicon atoms to retain at least 80 percent, preferably at least 90 percent, of the crystal structure of the starting zeolite Y; and (c) isolating the zeolite having an enhanced framework silicon content from the reaction mixture.

The starting zeolite Y composition can be synthesized by any of the processes well known in the art. Representative processes are disclosed in U.S. Pat. No. 3,130,007.

Another novel zeolite composition of the present invention is LZ-211 which has, in the dehydrated state and prior to calcination at a temperature in excess of 200° C., a chemical composition expressed in terms of mole ratios of oxides as $$(0.9\pm0.1)M_{2/n}O:Al_2O_3:xSiO_2$$

wherein "M" is an inorganic cation having the valence "n", preferably $H^+$, $NH_4^+$ or a metallic cation, and x is a value greater than 15, preferably within the range of 17 to 120, and most preferably from 17 to 35, having the characteristic crystal structure of mordenite as indicated by an X-ray powder diffraction pattern having at least the d-spacings set forth in Table C, below, and having extraneous silicon atoms in its crystal lattice in the form of $SiO_4$ tetrahedra, preferably in an average amount of at least 1.0 per 10,000A$^3$.

TABLE C

| d(A) | Intensity |
|---|---|
| 13.5 ± 0.2 | Medium |
| 9.0 ± 0.2 | Strong |
| 6.5 ± 0.1 | Strong |
| 4.5 ± 0.1 | Medium |
| 4.0 ± 0.1 | Medium |
| 3.8 ± 0.1 | Medium |
| 3.5 ± 0.1 | Strong |
| 3.4 ± 0.1 | Strong |
| 3.2 ± 0.1 | Strong |

A more limited subclass of LZ-211 compositions, i.e. those which are characterized by having both high molar $SiO_2/Al_2O_3$ ratios and low Defect Structure Factors, can be defined as having a chemical composition expressed in terms of mole fractions of framework tetrahedra as:

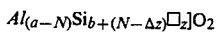

$$Al_{(a-N)}Si_{b+(N-\Delta z)}\square_z]O_2$$

wherein: the mole fraction of aluminum, N, removed from the framework of the starting zeolite is at least 0.3a; the Si/Al ratio has a value 7.5, preferably within the range 8.5 to 30; an increase in the Defect Structure Factor "$\Delta z$" of less than 0.08, an increase of silicon in the framework, $$\frac{N - \Delta z}{N},$$

of at least 0.5; a cation equivalent expressed as a monovalent cation species $M^+/Al$ of $0.9\pm0.1$.

The precursor of LZ-211, i.e. the starting mordenite zeolite, can be any naturally-occurring or synthetic form of mordenite having a molar $SiO_2/Al_2O_3$ ratio of not greater than 12, and in the case of the synthetic forms, synthesized in the substantial absence of organic cations. It is immaterial whether the starting mordenite is of so-called small pore or large pore varieties.

The novel zeolites denominated LZ-214 are the more siliceous forms of the prior known zeolite Rho and are prepared therefrom using the present process for silicon substitution. LZ-214 has, in the dehydrated state, a chemical composition expressed in terms of mole ratios of oxides $$0.9\pm0.1M_{2/n}O:Al_2O_3:xSiO_2$$

wherein "M" is a cation having the valence "n" and "x" is a value greater than 7, preferably in the range of 8 to 60, the characteristic crystal structure of zeolite Rho as indicated by an X-ray powder diffraction pattern having at least the d-spacings set forth in Table D, below and having extraneous silicon atoms in its crystal lattice in the form of $SiO_4$ tetrahedra, preferably in an amount of at least 1.0 per 10,000A$^3$.

TABLE D

| d(A) | Relative Intensity |
|---|---|
| 10.5 ± 0.3 | Very Strong |
| 6.1 ± 0.2 | Medium Strong |

TABLE D-continued

| d(A) | Relative Intensity |
|---|---|
| 4.7 ± 0.2 | Medium |
| 3.52 ± 0.1 | Medium |
| 3.35 ± 0.1 | Medium |
| 2.94 ± 0.1 | Medium |
| 2.65 ± 0.1 | Medium |

A more limited subclass of LZ-214 compositions, i.e. those which are characterized by having both high molar $SiO_2/Al_2O_3$ ratios and low Defect Structure Factors, can be defined as having a chemical composition expressed in terms of mole fraction of framework tetrahedra as:

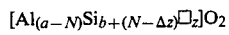

$$[Al_{(a-N)}Si_{b+(N-\Delta z)}\square_z]O_2$$

wherein: the mole fraction of aluminum, N, removed from the framework of the starting zeolite Rho is at least 0.3a; the Si/Al has a value $\geq 4$ preferably within the range 4.5 to 30; an increase in the Defect Structure Factor "$\Delta z$" of less than 0.08, an increase of silicon in the framework, $$\frac{N - \Delta z}{N},$$

of at least 0.5; a cation equivalent expressed as a monovalent cation species $M^+/Al$ of $0.9 \pm 0.1$. Zeolite Rho and the method for its manufacture are set forth in U.S. Pat. No. 3,904,738 issued Sept. 9, 1975.

The novel zeolites denominated LZ-212 are the more siliceous forms of the prior known zeolite AL and are prepared therefrom using the present process for silicon substitution. LZ-212 has, in the dehydrated state, a chemical composition expressed in terms of mole ratios of oxides $$0.9 \pm 0.1 M_{2/n}O:Al_2O_3:xSiO_2$$

wherein "M" is a cation having the valence "n" and "x" is a value greater than 8, preferably in the range of 9 to 60, the characteristic crystal structure of zeolite L as indicated by an X-ray powder diffraction pattern having at least the d-spacings set forth in Table E, below, and having extraneous silicon atoms in its crystal lattice in the form of $SiO_4$ tetrahedra, preferably in an amount of at least 1.0 per 10,000Å$^3$.

TABLE E

| d(A) | Relative Intensity |
|---|---|
| 15.8 ± 0.2 | Strong |
| 6.0 ± 0.1 | Medium |
| 5.8 ± 0.1 | Medium weak |
| 4.6 ± 0.1 | Medium |
| 4.4 ± 0.1 | Medium |
| 4.3 ± 0.1 | Medium |
| 3.9 ± 0.1 | Medium |
| 3.66 ± 0.1 | Medium |
| 3.48 ± 0.1 | Medium |
| 3.28 ± 0.1 | Medium |
| 3.18 ± 0.1 | Medium |
| 3.07 ± 0.1 | Medium |
| 2.91 ± 0.1 | Medium |

A more limited subclass of LZ-212 compositions, i.e, those which are characterized by having both high molar $SiO_2/Al_2O_3$ ratios and low Defect Structure Factors, can be defined as having a chemical composition can be expressed in terms of mole fraction of framework tetrahedra as:

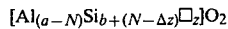

$$[Al_{(a-N)}Si_{b+(N-\Delta z)}\square_z]O_2$$

wherein: the mole fraction of aluminum, N, removed from the framework of the starting zeolite L is at least 0.3a; the Si/Al has a value $\geq 4$; an increase in the Defect Structure Factor, $\Delta z$, of less than 0.08, an increase of silicon in the framework, $$\frac{N - \Delta z}{N},$$

of at least 0.5; a cation equivalent expressed as a monovalent cation species $M^+/Al$ of $0.9 \pm 0.1$. Zeolite L and the method for its manufacture are set forth in U.S. Pat. No. 3,216,789 issued Nov. 9, 1965, and which is incorporated herein by reference.

The novel zeolites denominated LZ-215 are the more siliceous forms of the prior known zeolite N—A and are prepared therefrom using the present process for silicon substitution. LZ-215 has, in the dehydrated state, a chemical composition expressed in terms of mole ratios of oxides $$0.9 \pm 0.1 M_{2/n}O:Al_2O_3:xSiO_2$$

wherein "M" is a cation having the valence "n" and "x" is a value greater than 8, preferably in the range of 10 to 30, the characteristic crystal structure of zeolite N-A as indicated by an X-ray powder diffraction pattern having at least the d-spacings set forth in Table F, below, and having extraneous silicon atoms in its crystal lattice in the form of $SiO_4$ tetrahedra, preferably in an amount of at least 1.0 per 10,000Å$^3$.

TABLE F

| d(A) | Relative Intensity |
|---|---|
| 12.0 ± 0.5 | Very strong |
| 8.5 ± 0.5 | Very strong |
| 6.9 ± 0.2 | Strong |
| 5.4 ± 0.2 | Medium |
| 4.2 ± 0.1 | Medium |
| 4.0 ± 0.1 | Strong |
| 3.62 ± 0.1 | Very strong |
| 3.33 ± 0.1 | Medium |
| 3.20 ± 0.1 | Medium |
| 2.91 ± 0.1 | Medium |

A more limited subclass of LZ-215 compositions, i.e. those which are characterized by having both high molar $SiO_2/Al_2O_3$ ratios and low Defect Structure Factors, can be defined as having a chemical composition can be expressed in terms of mole fractions of framework tetrahedra as:

$$[Al_{(a-N)}Si_{b+(N-\Delta z)}\square_z]O_2$$

wherein: the mole fraction of aluminum N, removed from the framework of the starting zeolite N—A is at least 0.3a; the Si/Al has a value 54, preferably within the range 5 to 30; an increase in the Defect Structure Factor "$\Delta z$" of less than 0.08, an increase of silicon in the framework $$\frac{N - \Delta z}{N},$$

of at least 0.5; a cation equivalent expressed as a monovalent cation species M+/Al of 0.9±0.1. Zeolite N—A and the method for its manufacture are set forth in U.S. Pat. No. 3,306,922 issued Feb. 23, 1967, and which is incorporated herein by reference.

The novel zeolites denominated LZ-216 are the more siliceous forms of the prior known zeolite W and are prepared therefrom using the present process for silicon substitution. LZ-216 has, in the dehydrated state, a chemical composition expressed in terms of mole ratios of oxides $$0.9 \pm 0.1 M_{2/n}O:Al_2O_3:xSiO_2$$

wherein "M" is a cation having the valence "n" and "x" is a value greater than 8, preferably in the range of 8 to 60, the characteristic crystal structure of zeolite W as indicated by an X-ray powder diffraction pattern having at least the d-spacings set forth in Table G, below, and having extraneous silicon atoms in its crystal lattice in the form of SiO$_4$ tetrahedra, preferably in an amount of at least 1.0 per 10,000Å$^3$.

TABLE G

| d(A) | Relative Intensity |
|---|---|
| 8.2 ± 0.2 | Medium Strong |
| 7.1 ± 0.2 | Very Strong |
| 5.3 ± 0.1 | Medium Strong |
| 5.0 ± 0.1 | Medium Strong |
| 4.5 ± 0.1 | Medium |
| 4.31 ± 0.1 | Medium |
| 3.67 ± 0.1 | Medium |
| 3.25 ± 0.1 | Strong |
| 3.17 ± 0.1 | Strong |
| 2.96 ± 0.1 | Medium |
| 2.73 ± 0.1 | Medium |
| 2.55 ± 0.1 | Medium |

A more limited subclass of LZ-216 compositions, i.e. those which are characterized by having both high molar SiO$_2$/Al$_2$O$_3$ ratios and low Defect Structure Factors, can be defined as having a chemical composition expressed in terms of mole fractions of framework tetrahedra as:

$$[Al_{(a-N)}Si_{b+(N-\Delta z)}\square_z]O_2$$

wherein: the more fraction of aluminum, N, removed from the framework of the starting zeolite W is at least 0.3a; the Si/Al has a value ≧4, an increase in the Defect Structure Factor, Δz, of less than 0.08, an increase of silicon in the framework $$\frac{N - \Delta z}{N},$$

of at least 0.5; a cation equivalent expressed as a monovalent cation species M+/Al of 0.9±0.1. Zeolite W and the method for its manufacture are set forth in U.S. Pat. No. 3,012,853 issued Dec. 12, 1961, and which is incorporated herein by reference.

The novel zeolites denominated LZ-217 are the more siliceous forms of the prior known zeolite mineral offretite and its synthetic analogues, zeolite O and TMA-Offretite, and are prepared therefrom using the present process for silicon substitution. LZ-217 has, in the dehydrated state, a chemical composition expressed in terms of mole ratios of oxides:

$$0.9 \pm 0.1 M_{2/n}O:Al_2O_3:xSiO_2$$

wherein M is a cation having the valence "n" and "x" has a value of at least 8 and the characteristic crystal structure of offretite as indicated by an X-ray powder diffraction pattern having at least the d-spacings set forth in Table H, below, and having extraneous silicon atoms in its crystal lattice in the form of SiO$_4$ tetrahedra, preferably in an amount of at least 1.0 per 10,000Å$^3$.

TABLE H

| d(A) | Relative Intensity |
|---|---|
| 11.4 ± 0.2 | Very Strong |
| 6.6 ± 0.1 | Medium Strong |
| 5.7 ± 0.1 | Medium Weak |
| 4.31 ± 0.1 | Medium |
| 3.75 ± 0.1 | Medium |
| 3.58 ± 0.1 | Medium |
| 3.29 ± 0.1 | Medium |
| 3.14 ± 0.1 | Medium |
| 2.84 ± 0.1 | Medium Strong |
| 2.67 ± 0.1 | Medium Weak |

A more limited subclass of LZ-217 compositions, i.e. those which are characterized by having both high molar SiO$_2$/Al$_2$O$_3$ ratios and low Defect Structure Factors, can be defined as having a chemical composition expressed in terms of mole fractions of framework tetrahedra as:

$$[Al_{(a-N)}Si_{b+(N-\Delta z)}\square_z]O_2$$

wherein: the mole fraction of aluminum, N, removed from the framework of the starting zeolite offretite is at least 0.3a; the Si/Al has a value ≧4, an increase in the Defect Structure Factor, Δz, of less than 0.08, an increase of silicon in the framework, $$\frac{N - \Delta z}{N},$$

of at least 0.5; a cation equivalent expressed as a monovalent cation species M+/Al of 0.9±0.1.

The novel zeolites denominated LZ-218 are the more siliceous forms of the prior known zeolite mineral chabazite and the structurally related synthetic zeolite R, zeolite G, and zeolite D, and are prepared therefrom using the present process for silicon substitution. LZ-218 has, in the dehydrated state, chemical composition expressed in terms of mole ratios of oxides:

$$0.9 \pm 0.1 M_{2/n}O:Al_2O_3:xSiO_2$$

wherein M is a cation having the valence "n" and "x" has a value of greater than 8, preferably in the range of 8 to 20, and the characteristic crystal structure of chabazite as indicated by an X-ray powder diffraction pattern having at least the d-spacings set forth in Table I, below, and having extraneous silicon atoms in its crystal lattice in the form of SiO$_4$ tetrahedra, preferably in an amount of at least 1.0 per 10,000Å$^3$.

TABLE I

| d(A) | Relative Intensity |
|---|---|
| 9.2 ± 0.3 | Very Strong |
| 6.8 ± 0.2 | Medium |
| 5.5 ± 0.2 | Medium |
| 4.9 ± 0.2 | Medium |
| 4.3 ± 0.1 | Very Strong |
| 3.53 ± 0.1 | Medium |
| 3.43 ± 0.1 | Medium |

TABLE I-continued

| d(A) | Relative Intensity |
|---|---|
| 2.91 ± 0.1 | Medium Strong |

A more limited subclass of LZ-218 compositions, i.e. those which are characterized by having both higher molar SiO₂/Al₂O₃ ratios and low Defect Structure Factors, can be defined as having a chemical composition expressed in terms of mole fractions of framework tetrahedra as:

$$[Al_{(a-N)}Si_{b+(N-\Delta z)}\square_z]O_2$$

wherein: the mole fraction of aluminum, N, removed from the framework of the starting zeolite is at least 0.3a; the Si/Al has a value ≧4 an increase in the Defect Structure Factor, Δz, of less than 0.08, an increase of silicon in the framework, $$\frac{N - \Delta z}{N},$$

of at least 0.5; a cation equivalent expressed as a monovalent cation species M+/Al of 0.9±0.1.

The novel zeolites denominated LZ-219 are the more siliceous forms of the prior known zeolite mineral clinoptilolite, and are prepared therefrom using the present process for silicon substitution. LZ-219 has, in the dehydrated state a chemical composition expressed in terms of mole ratios of oxides:

$$0.9\pm0.1M_{2/n}O:Al_2O_3:xSiO_2$$

wherein M is a cation having the valence "n" and "x" has a value of greater than 11, preferably in the range of 12 to 20, and the characteristic crystal structure of clinoptilolite as indicated by an X-ray powder diffraction pattern having at least the d-spacings set forth in Table J, below, and having extraneous silicon atoms in its crystal lattice in the form of SiO₄ tetrahedra, preferably in an amount of at least 1.0 per 10,000Å³.

TABLE J

| d(A) | Relative Intensity |
|---|---|
| 8.9 ± 0.2 | Very Strong |
| 7.8 ± 0.2 | Medium |
| 6.7 ± 0.2 | Medium Weak |
| 6.6 ± 0.2 | Medium Weak |
| 5.1 ± 0.2 | Medium Weak |
| 3.95 ± 0.1 | Medium Strong |
| 3.89 ± 0.1 | Medium |
| 3.41 ± 0.1 | Medium |
| 3.37 ± 0.1 | Medium |
| 3.33 ± 0.1 | Medium |
| 3.17 ± 0.1 | Medium |

A more limited subclass of LZ-219 compositions, i.e. those which are characterized by having both higher molar SiO₂/Al₂O₃ ratios and low Defect Structure Factors, can be defined as having a chemical composition, expressed in terms of mole fraction of framework tetrahedra as:

$$[Al_{(a-N)}Si_{b+(N-\Delta z)}\square_z]O_2$$

wherein the mole fraction of aluminum removed, "N", from the starting clinoptilolite is at least 0.3a; a Si/Al ratio of ≧5.5, preferably greater than 6.0, an increase in the Defect Structure Factor, Δz, of less than 0.08; an increase of silicon in the framework, $$\frac{N - \Delta z}{N},$$

of at least 0.5, a cation equivalent expressed as a monovalent cation species M+/Al of 0.9±0.1.

The novel zeolites denominated LZ-220 are the more siliceous forms of the prior known mineral erionite and its synthetic analog, Zeolite T, and are prepared therefrom using the present process for silicon substitution. LZ-220 has, in the dehydrated state a chemical composition expressed in terms of mole ratios of oxides:

$$0.9\pm0.1M_{2/n}O:Al_2O_3:xSiO_2$$

wherein M is a cation having the valence "n" and "x" has a value of at least 8, and preferably in the range of 8 to 20, and having the characteristic crystal structure of erionite as indicated by an X-ray powder diffraction pattern having at least the d-spacings set forth in Table K, below, and having extraneous silicon atoms in its crystal lattice in the form of SiO₄ tetrahedra, preferably in an amount of at least 1.0 per 10,000Å³.

TABLE K

| d(A) | Relative Intensity |
|---|---|
| 11.3 ± 0.5 | Very Strong |
| 6.6 ± 0.2 | Strong |
| 4.33 ± 0.1 | Medium |
| 3.82 ± 0.1 | Medium |
| 3.76 ± 0.1 | Medium |
| 3.31 ± 0.1 | Medium |
| 2.86 ± 0.1 | Medium |
| 2.81 ± 0.1 | Medium |

A more limited subclass of LZ-220 compositions, i.e. those which are characterized by having both high molar SiO₂/Al₂O₃ ratios and low Defect Structure Factors, can be defined as having a chemical composition expressed in terms of mole fraction of framework tetrahedra as:

$$[Al_{(a-N)}Si_{b+(N-\Delta z)}\square_z]O_2$$

wherein the mole fraction of aluminum, N, removed from the starting zeolite erionite, is at least 0.3a; the Si/Al has a value ≧4,0 and preferably greater than 5.0; an increase in the Defect Structure Factor, Δz, of less than 0.08, an increase of silicon in the framework $$\frac{N - \Delta z}{N},$$

of at least 0.5; a cation equivalent expressed as a monovalent cation species M+/Al of 0.9±0.1.

The novel zeolites denominated LZ-215 are the more siliceous forms of the prior known zeolite Omega and are prepared therefrom using the present process for silicon substitution. LZ-213 has, in the dehydrated state, a chemical composition expressed in terms of mole ratios of oxides $$0.9\pm0.1M_{2/n}O:Al_2O_3:xSiO_2$$

wherein M is a cation having a valence "n" and "x" is a value greater than 20, preferably in the range of 22 to 60, and the characteristic crystal structure of zeolite Omega as indicated by an X-ray powder diffraction pattern having at least the d-spacings set forth in Table L, below, and having extraneous silicon atoms in its crystal lattice in the form of SiO₄ tetrahedra, preferably in an amount of at least 1.0 per 10,000Å³.

TABLE L

| d(A) | Relative Intensity |
|---|---|
| 15.8 ± 0.4 | Medium |
| 9.1 ± 0.2 | Very Strong |
| 7.9 ± 0.2 | Medium |
| 6.9 ± 0.2 | Medium |
| 5.95 ± 0.1 | Medium |
| 4.69 ± 0.1 | Medium |
| 3.79 ± 0.1 | Very Strong |
| 3.62 ± 0.05 | Medium |
| 3.52 ± 0.1 | Strong |

A more limited subclass of LZ-213 compositions, i.e. those which are characterized by having both high molar $SiO_2/Al_2O_3$ ratios and low Defect Structure Factors, can be defined as having a chemical composition expressed in terms of mole fractions of framework tetrahedra as:

$$[Al_{(a-N)}Si_{b+(n-\Delta z)}\square_z]O_2$$

wherein the mole fraction of aluminum, N, removed from the starting zeolite Omega is at least 0.3a; the Si/Al has a value $\geq 10$, and preferably in the range 1 of 11 to 30; an increase in the Defect Structure Factor, $\Delta z$, of less than 0.08, an increase of silicon in the framework, $$\frac{N - \Delta z}{N},$$

of at least 0.5; a cation equivalent expressed as a monovalent cation species M⁺/Al of 0.9±0.1.

In general it is preferred that the cation equivalent of every novel composition of the present invention, expressed as a monovalent cation species M⁺/Al, is at least 0.8, and more preferably at least 0.85. With respect to those particular species herein which have been denominated as "LZ" and є three digit number, the cation equivalent values specified for each species subclass is also the preferred value for the other members of the more broadly defined members of each particular species.

The invention is illustrated by the procedures and products of the following examples:

EXAMPLE 1

(a) 396 grams of $(NH_4)_2SiF_6$ were dissolved with stirring in 3 liters of distilled water at 50° C. This solution was put into a dropping funnel fitted on a three-necked round-bottom flask. A solution of 6400 grams of ammonium acetate in 8 liters of water was then added to the flask. An 85% ammonium exchanged zeolite NaY in the amount of 1420 grams (hydrated weight, molar $SiO_2/Al_2O_3=4.85$) was slurried up in the ammonium acetate solution at 75° C. A mechanical stirrer was fitted to the center hole of the flask, which was also fitted with the necessary thermocouples and temperature controllers. Dropwise titration of the 3 liters of $(NH_4)_2SiF_6$ solution was begun at 75° C. After completion of titration, which required a period of 2.5 hours, the pH of the slurry was measured as 6.0. Overnight heating of the mixture was conducted at 95° C., the dropping funnel having been replaced with a condenser. The stoichiometry of the reaction was of the order of one Si added as $(NH_4)_2SiF_6$ for every two Al atoms present in the zeolite. At the conclusion of the reaction, the pH of the slurry was 6.75.

The reaction mixture was then filtered as two separate batches and the solids washed with 18 liters of hot distilled water. There was a residue of $(NH_4)_3AlF_6$ present in the washed materials. An additional wash of the products in ammonium acetate was performed, followed by a thorough wash with boiling distilled H₂O until qualitative tests could not detect either aluminum or fluoride ions in the effluent wash water.

The properties of this material were as follows:

| Chemical Analysis: Composition By Weight %: | Molar Composition: |
|---|---|
| Na₂O - 0.66 | Na₂O/Al₂O₃ = 0.08 |
| (NH₄)₂O - 6.50 | (NH₄)₂O/Al₂O₃ = 0.91 |
| Al₂O₃ - 13.97 | Cation Equivalent = 0.99 |
| SiO₂ - 78.55 | Cation Deficiency = 1% |
| F⁻ - 0.02 | F₂/Al = 0.005 |
| | SiO₂/Al₂O₃ = 9.54 |

The product had the characteristic X-ray powder diffraction pattern of zeolite LZ-210 and had a unit cell dimension ($a_o$) of 24.51 A. From peak intensity measurements, the crystallinity of the product was 94 percent. The water adsorption capacity at 25° C. and 4.6 Torr was 28.7 weight-%. The oxygen adsorption capacity at −183° C. and 100 Torr oxygen pressure was 29.3 weight-%. The crystal-collapse temperature of the product as measured by a standard DTA procedure was at 1061° C. Untreated NH₄Y using the same DTA technique collapses at 861° C. The framework infrared spectra of the starting zeolite and the product zeolite are shown in FIG. 1 of the drawings.

Figure 2:
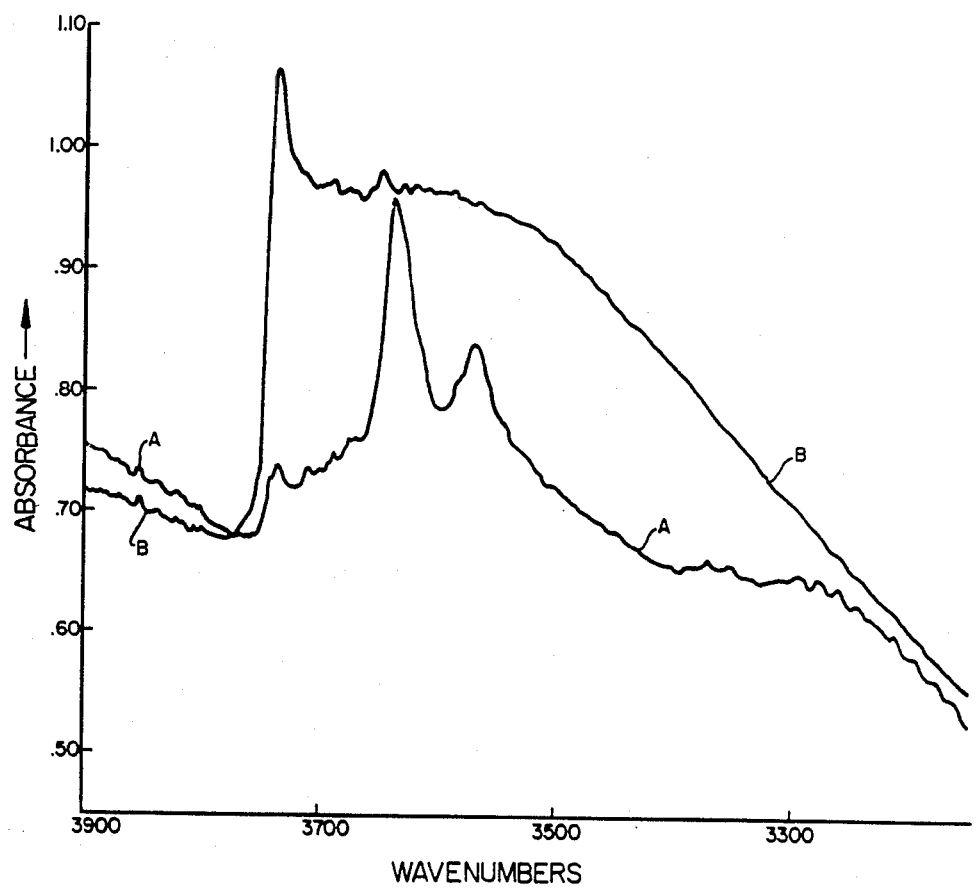

(b) The product of part (a) above was subjected to a mild ion exchange treatment with NaCl solution to replace most of the ammonium cations and then heated under vacuum at 200° C. for 1 hour to remove adsorbed (molecular) water, and its hydroxyl infrared spectrum obtained. The spectrum, denoted as "A" in FIG. 2, shows a small broad absorption band with maximum absorbance at about 3300 cm⁻¹ which is attributed to the residual undecomposed ammonium cations, two OH absorption bands at 3640 cm⁻¹ and 3550 cm⁻¹ attributed to OH groups produced by the decomposition of some of the residual ammonium cations, and a very small broad absorption band due to the hydroxyl "nests" in vacant framework sites in the zeolite. This absorption band is best observed in the region of about 3710–3715 cm⁻¹ when compared to the background absorption due to the zeolite.

Four hundred fifty gm of NaY containing 1.97 moles of aluminum as Al₂O₃ were slurried in 8 liters of distilled water with 287.7 gm of H₄ EDTA (0.98 moles). The stirring slurry was refluxed for 18 hours, filtered washed and dried in air 2 hours at 110° C. From the chemical analyses the product, Labled Defect Structure Standard, Sample A, was 48% depleted in aluminum. The calculated mole fraction of defects in the structure of Defect Structure Standard, Sample A, was 0.140. The framework composition expressed in terms of tetrahedral mole fractions (TO₂) was:

$(Al_{0.150}Si_{0.710}\square_{0.140})O_2$

Spectrum B of FIG. 2 is the spectrum of Defect Structure Standard, Sample A, from which 48% of the zeolite framework aluminum has been removed by extraction with H₄ EDTA. The infrared sample was heated under vacuum at 200° C. for 1 hour to remove water. The spectrum shows the expected broad absorption band due to hydroxyl nests in vacant framework sites. In addition, there is a sharp absorption band at 3745 cm$^{-1}$ attributed to terminal ≡SiOH groups in the zeolite structure as previously discussed. Similar bands are also observed with amorphous silica. The spectra have been recorded in FIG. 2 such that a nearly quantitative comparison can be made between the two samples. It becomes obvious then that the product of the (NH₄)₂SiF₆ treatment of NH₄Y, from which 50% of the framework aluminum atoms have been removed, contains very few residual vacancies or hydroxyl nests in the framework. It is even further obvious that the silicon taken up by the zeolite during the (NH₄)₂SiF₆ treatment must be substituted into the previously vacant framework sites. No new absorption band at 3745 cm$^{-1}$ due to amorphous ≡SiOH is observed in this spectrum.

(c) The absolute absorbance of the Defect Structure Standard, Sample A, measured at 3710 cm$^{-1}$ as in FIG. 2 was 0.330. The absolute absorbance of the LZ-210 product of part (b) measured at 3710 cm$^{-1}$ as in FIG. 2 was 0.088. The Defect Structure Factor, z, for the LZ-210 product was calculated:

(unknown z) =

$$\frac{\left[\begin{array}{c}\text{Absolute Absorbance}\\\text{of the Unknown}\\\text{Measured at 3710 cm}^{-1}\end{array}\right] \times \left[\begin{array}{c}\text{mole fraction of}\\\text{defects in the}\\\text{standard}\end{array}\right]}{\left[\begin{array}{c}\text{Absolute Absorbance of Standard measured at}\\\text{3710 cm}^{-1}\end{array}\right]}$$

Substituting into the equation, the defect structure factor for the LZ-210 product is $$\frac{0.088 \times 0.140}{0.330};$$

z = 0.037.

The framework composition of the LZ-210 product of part (b) of this Example can be expressed:

$(Al_{0.167}Si_{0.796}\square_{0.037})O_2$

The framework composition of the starting NH₄Y, used to prepare the LZ-210 product can be expressed:

$(Al_{0.292}Si_{0.708}\square_0)O_2$

Comparing the LZ-210 product with the NH₄Y starting material, the change in Defect Structure Factor, Δz, is 0.037, well below the preferred maximum specification for LZ-210 of 0.05. The mole fraction of aluminum removed from the framework, N, is 0.125, which is substantially greater than the minimum specification that N≧0.3a. The increased silicon content of the framework of the LZ-210 product, expressed as a function of the removed aluminum actually replaced by silicon is:

$$\frac{N - \Delta z}{N} = \frac{0.125 - 0.037}{0.125} = 0.70$$

EXAMPLE 2

This example provides further proof that in the present process aluminum is removed from the zeolite framework and replaced in the framework by silicon from an extraneous source. Two grams (anhydrous weight) of ammonium zeolite Y (SiO₂/Al₂O₃ molar ratio=4.8) were slurried in 100 ml of 3.4 molar ammonium acetate solution at 75° C. The total aluminum content of the zeolite sample was 8.90 millimoles. A 50 ml solution containing 0.793 gm. (NH₄)₂SiF₆ was added to the stirring slurry of the zeolite in 2 ml increments with 5 minutes between each addition. A total of 4.45 millimoles of Si was added to the zeolite. The mixture was kept at 75° C. for 18 hours, filtered and washed. Analysis of the filtrate and washings showed that of the 4.45 millimoles of silicon added, 3.48 millimoles were consumed by the zeolite during the reaction. At the same time, the zeolite released 3.52 millimoles of aluminum to solution. The molar SiO₂/Al₂O₃ of the zeolite, based on the filtrate analysis was calculated to be 9.30. Chemical analysis of the solid product gave a SiO₂/Al₂O₃ ratio of 9.31. These data prove conclusively that as a result of our treatment using buffered (NH₄)₂SiF₆, silicon insertion had occurred.

From the peak intensity measurements, the product was 106 percent crystalline. The unit cell (a₀) was 24.49 A. The DTA exotherm denoting crystal collapse was found at 1037° C. The intensity of the infrared OH absorption band measured at 3710 cm$^{-1}$ following activation of the zeolite wafer at 200° C. attributable to (OH)₄ groups in aluminum depleted sites was very small, indicating that very few defect sites were present in the product. The oxygen adsorption capacity of the product measured at −183° C. and 100 Torr was 25.8 weight percent.

EXAMPLE 3

To a reaction vessel provided with heating and stirring means and containing 121.8 pounds (14.61 gal.) of water and 18.5 pounds of ammonium acetate was added 30 pounds (anhydrous basis) of 80% ammonium exchanged zeolite NaY having a SiO₂/Al₂O₃ molar ratio of 4.97. The resulting slurry was heated to 75° C. In a separate vessel an ammonium fluorosilicate [(NH₄)₂SiF₆] solution was prepared by dissolving 12.25 pounds of the silicate in 46.8 pounds of water at a temperature of 50° C. By means of a metering pump, the fluorosilicate solution was added to the buffered zeolite slurry at the rate of 0.031 gallons per minute. About 3 hours was required to complete the addition. At the end of the addition period, the resultant mixture was heated to 95° C. with continuous agitation for a period of 16 hours, filtered, and washed with about 250 gallons of water at a temperature of 50° C. and dried. The product had the following properties:

(a) X-ray crystallinity (relative)=90%.

(b) Temperature of crystal collapse (by DTA exotherm)=1110° C.

(c) Oxygen adsorption capacity (−183° C., 100 torr)=26.1 wt-%.

(d) Water adsorption capacity (25° C., 4.6 torr)=24.5 wt-%.

(e) SiO₂/Al₂O₃ molar ratio=11.98.

(f) Zeolitic cation equivalent $(M_2O/Al_2O_3) = 1.0$.
(g) Unit cell dimension, $a_o$, = 24.44 Angstroms.

The framework composition of the starting $NH_4Y$ expressed in terms of its molar fractions of tetrahedra can be stated thusly:

$$(Al_{0.286}Si_{0.714})O_2$$

cake washed until tests of the wash water were negative for aluminum and fluoride ion. This was labled Sample C.

(c) The chemical and other analyses for the two samples are set forth below together with similar data obtained on Defect Structure Standard, Sample A, prepared in (b) of Example 1.

|  | Specifications | Sample A* | Sample B** | Sample C*** |
|---|---|---|---|---|
| $SiO_2/Al_2O_3$ (molar) Product | $\geq 8$ | 9.49 | 9.14 | 10.49 |
| Cation Equivalent $(M^+/Al)$ | $\geq 0.9$ | 0.95 | 0.92 | 0.97 |
| Absolute Absorbance at 3710 cm$^{-1}$ | — | 0.330 | 0.275 | 0.079 |
| Framework Composition; [Starting zeolite] Mole Fraction of oxides $(TO_2)$ [Product zeolite] | — | $(Al_{0.290}Si_{0.710})O_2$ $(Al_{0.150}Si_{0.710}\square_{0.140})O_2$ | $(Al_{0.286}Si_{0.714})O_2$ $(Al_{0.159}Si_{0.724}\square_{0.117})$ | $(Al_{0.289}Si_{0.711})O_2$ $(Al_{0.155}Si_{0.811}\square_{0.034})O_2$ |
| Mole Fraction of Aluminum Removed, N | $\geq 0.3a$ | 0.140 (0.3a = .087) | 0.127 (0.3a = .086) | 0.134 (0.3a = .087) |
| % Aluminum Depletion $\frac{N}{a} \times 100$ | $\geq 5$ | 48 | 44 | 46 |
| Net Change in the Defect Structure Factor, $\Delta z$ | $\leq 0.08$ | 0.140 | 0.117 | 0.034 |
| Moles of Silicon substantial per mole of aluminum removed, $\frac{N - \Delta z}{N}$ | $\geq 0.5$ | 0 | 0.08 | 0.75 |
| Product X-ray Crystallinity, % I | $\geq 80$ | 68 | 68 | 90 |
| Unit Cell, $(a_o)$ |  | 24.59 | 24.57 | 24.45 |
| DTA Crystal Collapse Temp., °C. | — | 980 | 947 | 1092 |

*Defect Structure Standard
**Prior art (U.S. Pat. No. 4,093,568)
***LZ-210

The Defect Structure Factor, z, for the LZ-210 product is 0.055; the infrared absolute absorbance measured at 3710 cm$^{-1}$ was 0.130. The framework composition of the LZ-210 product can be expressed as:

$$(Al_{0.135}Si_{0.810}\square_{0.055})O_2$$

The change in the Defect Structure Factor, $\Delta z$, for the LZ-210 is 0.055. The mole fraction of aluminum removed, N, is 0.151 and the amount of removed aluminum replaced by silicon is $$\frac{N - \Delta z}{N} = 0.64.$$

All other characteristic properties of the modified zeolite compositions of this invention, i.e. X-ray powder diffraction pattern and infrared spectra were exhibited by the product of this example.

EXAMPLE 4

(a) Forty-seven grams of $NH_4$—Y containing 0.2065 moles of aluminum as $Al_2O_3$, were treated with $(NH_4)_2H_2$ EDTA and dilute HCl, sufficient to extract 43% of the framework aluminum in the $NH_4Y$, over a period of 4 days in accordance with the teachings and examples of Kerr in U.S. Pat. No. 4,093,560. This was labled Sample B.

(b) Two thousand five hundred grams of $NH_4Y$ were stirred into 10 liters of 3.5M ammonium acetate solution at 75° C. A 3.5 liter solution of water containing 990 gm. $(NH_4)_2SiF_6$ was heated to 75° C. and added in 100 ml. increments to the $NH_4Y$ slurry at the rate of 100 ml every 5 minutes. Following the addition of the fluorosilicate solution, the temperature of the slurry was raised to 95° C. and the slurry was digested at 95° C. for 17 hours. The digested slurry was filtered and the filter These data clearly distinguish the LZ-210 product (Sample C) from the prior art product (Sample B). Both Sample B and Sample C are aluminum depleted to the same level as the reference Defect Structure Standard (Sample A). The prior art product shows no evidence that silicon from any source has substituted in the framework in place of the aluminum. In fact, the prior art sample and the reference Defect Structure Standard are nearly identical in all of their properties. The LZ-210 product shows evidence of very little defect structure, indicating that in this case silicon has replaced aluminum in the framework.

EXAMPLE 5

(A) One hundred grams of a well-crystallized zeolite Y having a molar $SiO_2/Al_2O_3$ ratio of 3.50 was slurried with 500 ml. of a 4 molar aqueous $NH_4Cl$ solution at reflux for one hour and then isolated by filtration. This exchange procedure was repeated twice, and the product of the third exchange washed with hot distilled water until tests of the wash water were negative for chloride ions. Sixty grams (anhydrous weight) of the $NH_4^+$-exchanged product were slurried in 400 ml. of 3.4 molar ammonium acetate solution at 95° C. A solution of 12.53 grams of ammonium fluorosilicate in 150 ml. of water was added to the slurry (pH$\geq$6) in 1 ml. increments at the rate of 1 ml. per minute. The stoichiometric ratio of moles of Si, added as ammonium fluorosilicate, to the moles of Al present in the zeolite was 0.21. Following the addition of the fluorosilicate solution, the slurry was digested for 3 hours at 95° C., filtered, and the filter cake thoroughly washed until tests of the wash water were negative for aluminum and the fluoride ion. The chemical and other analyses for the starting $NH_4Y$ zeolite and the product zeolite are set forth below:

|  | NH₄-Y | Product |
|---|---|---|
| Na₂O wt. % | 3.1 | 2.8 |
| (NH₄)₂O wt. % | 9.8 | 8.3 |
| Al₂O₃ wt. % | 28.3 | 22.9 |
| SiO₂ wt. % | 58.2 | 65.2 |
| SiO₂/Al₂O₃ (molar) | 3.50 | 4.84 |
| Na$^+$/Al | 0.18 | 0.20 |
| NH₄$^+$/Al | 0.68 | 0.71 |
| Cation Equiv. (M$^+$/Al) | 0.86 | 0.91 |
| X-ray Crystallinity: | | |
| (a) By Peak Intensity | 100 | 98 |
| (b) By Peak Area | 100 | 97 |
| Unit cell dimension (a$_o$) | 24.81 | 24.734 |
| Framework Infrared: | | |
| Asymmetric Stretch, cm$^{-1}$ | 891 | 1003 |
| Symmetric Stretch, cm$^{-1}$ | 771 | 782 |
| Hydroxyl Infrared: | | |
| Absolute Abs. at 3710 cm$^{-1}$ | 0.039 | 0.058 |
| Defect Structure Factor, z | 0.016 | 0.025 |

The framework mole fractions of tetrahedra are set forth below for the starting NH₄Y and the LZ-210 product.

| (a) Mole fraction of oxides (TO₂) | (Al$_{0.358}$Si$_{0.626}$□$_{0.016}$)O₂ |
|---|---|
|  | (Al$_{0.285}$Si$_{0.690}$□$_{0.025}$)O₂ |
| (b) Mole fraction of aluminum removed, N | 0.073 |
| (c) % aluminum removed, n/a × 100 | 20 |
| (d) change in defect structure factor, Δz | 0.009 |
| (e) moles of silicon substituted per mole of aluminum removed, $\frac{N - \Delta z}{N}$ | 0.88 |

The analytical data show conslusively that framework aluminum was removed and replaced by silicon as a result of the fluorosilicate treatment. The X-ray crystallinity was fully maintained and the unit cell dimension decreased as would be expected due to the smaller atomic size of silicon with respect to aluminum.

(B) The adverse effects of using a starting zeolite having a molar SiO₂/Al₂O₃ ratio of less than 3 is demonstrated by the following procedure:

One hundred grams of an ammonium-exchanged zeolite X having a molar SiO₂/Al₂O₃ ratio of 2.52 were slurried in 1000 ml. of an aqueous 2.0 molar solution of ammonium acetate at a temperature of 75° C. Five hundred milliliters of a second aqueous solution containing 59.75 grams of ammonium fluorosilicate was added to the slurry in 10 ml. increments at a rate of 10 ml. every 5 minutes. The stoichiometric ratio of moles of silicon added to the moles of aluminum present in the zeolite was 0.50. Following the addition of the fluorosilicate solution, the slurry was digested for 16 hours at 95° C., filtered, and washed with distilled water until tests of the wash water were negative for both aluminum and fluoride ions. The chemical and other analyses for the starting NH₄—X zeolite and the product zeolite are set forth below:

|  | NH₄-X | Product |
|---|---|---|
| Na₂O - wt. % | 3.2 | 0.5 |
| (NH₄)₂O - wt. % | 10.8 | 6.5 |
| Al₂O₃ - wt. % | 34.2 | 19.0 |
| SiO₂ - wt. % | 50.8 | 72.0 |
| SiO₂/Al₂O₃ (molar) | 2.52 | 6.43 |
| Na$^+$/Al | 0.15 | 0.04 |
| NH₄$^+$/Al | 0.62 | 0.67 |
| Cation Equivalent (M$^+$/Al) | 0.77 | 0.71 |

|  | NH₄-X | Product |
|---|---|---|
| X-ray Crystallinity: | | |
| (a) by Peak Intensity | 100 | <10 |
| Unit cell dimension (a$_o$), A. | 24.945 | — |
| Framework Infrared: | | |
| (a) Asymmetric Stretch, cm$^{-1}$ | 987 | 1049 |
| (b) Symmetric Stretch, cm$^{-1}$ | 749 | 780 |
| Hydroxyl Infrared: | | |
| Absolute Abs. at 3710 cm$^{-1}$ | 0.110 | 0.224 |
| Defect Structure Factor, z | 0.047 | 0.095 |

It is apparent from the foregoing data that although dealumination in conjunction with silicon substitution into the zeolite framework did occur, the procedure was highly destructive of the crystallinity of the product zeolite. Also the remaining crystal structure contained an undue number of defect site.

(C) In a second attempt to treat the NH₄—X of part (B), a 5 gram sample of the zeolite was slurried in 100 ml. of a 3.4 molar ammonium acetate solution at 95° C. Fifty milliliters of a second aqueous solution containing 1.49 grams of ammonium fluorosilicate was added to the slurry in 2 ml. increments at a rate of 2 ml. every five minutes. The stoichiometric ratio of moles of silicon added to the moles of zeolitic aluminum was 0.25. Following the completion of the addition of the fluorosilicate solution, the slurry was digested for 3 hours, filtered and washed. Although the treatment of this part (C) was much less rigorous than that of part (B) above by virtue of increased buffering, lower fluorosilicate concentration and shorter digestion time, the product of part (C) was found to be nearly amorphous.

EXAMPLE 6

The process for substituting extraneous silicon for framework aluminum atoms in a zeolite having the zeolite A-type structure is illustrated by the following experimental procedure: Approximately 5 grams of zeolite N—A (prepared hydrothermally using a combination of sodium hydroxide and tetramethylammonium hydroxide in accordance with the teachings of U.S. Pat. No. 3,305,922) having a SiO₂/Al₂O₃ molar ratio of 6.0 was calcined in air at 550° C. for 17 hours to remove the tetramethylammonium cations. The resulting decationized form of the zeolite was ion-exchanged with an aqueous solution of NH₄Cl. A twelve gram (anhyd.) sample of the resulting NH₄—A zeolite was slurried in 300 ml. of an aqueous 3.4 molar ammonium acetate solution at 75° C. and 100 ml. of an aqueous solution containing 4.63 gm. ammonium fluorosilicate was added thereto in 1 ml. increments at the rate of 1 ml. per minute. Following completion of the addition of the fluorosilicate solution, the slurry was digested for 16 hours at 75° C. filtered, and the solids then thoroughly washed with water. The preliminary decationization and subsequent rehydration of the starting zeolite introduced a considerable number of defect sites into the zeolite starting material which were not, under the conditions employed in the fluorosilicate treatment, filled by silicon insertion. The observed decrease in the unit cell dimension, a$_o$, from 11.994 to 11.970, however, establishes that extraneous silicon from the fluorosilicate was substituted for original framework aluminum atoms in the zeolite. The results of chemical and other analyses for the starting NH₄—NA and the LZ-215 product zeolite are set forth below:

|  | NH4-NA | LZ-215 Product |
|---|---|---|
| SiO2/Al2O3 (molar) | 5.43 | 7.38 |
| Cation Equivalent, (M+/Al) | 0.65 | 0.69 |
| X-Ray Crystallinity: |  |  |
| (a) % by Peak Intensity | 100 | 60 |
| (b) % by Peak Area | 100 | 59 |
| Unit Cell Dimension ($a_o$) | 11.994 | 11.970 |
| Framework Infrared: |  |  |
| asymmetric Stretch, cm$^{-1}$ | 1062 | 1069 |
| symmetric Stretch cm$^{-1}$ | 713 | 722 |
| Hydroxyl Infrared: |  |  |
| Defect Structure Factor (z) | 0.042 | 0.079 |
| Absolute Absorbance at 3710 cm$^{-1}$ | 0.100 | 0.186 |

The framework mole fractions of tetrahedra are set forth below for the starting NH4—NA and the LZ-215 product.

| (a) Mole fraction of oxides (TO2) | $(Al_{0.258}Si_{0.700}\square_{0.042})O_2$ |
|---|---|
|  | $(Al_{0.196}Si_{0.725}\square_{0.079})O_2$ |
| (b) Mole fraction of aluminum removed, N | 0.062 |
| (c) % aluminum removed, N/a × 100 | 24 |
| (d) Change in defect structure factor, $\Delta z$, | 0.037 |
| (e) Moles of silicon substituted per mole of aluminum removed, (N-$\Delta z$)/N | 0.40 |

In order to prepare a high silica zeolite of the type-A structure which is substantially free of defect sites it is necessary either to maintain the organic cations in the starting zeolite or to thermally degrade the organic cations to NH4+ or H+ cations under controlled conditions such as minimal decomposition temperatures and in an environment of nitrogen and/or ammonia.

EXAMPLE 7

(A) The substitution of extraneous silicon into the crystal lattice of a zeolite of the mordenite type is illustrated by this example in which a commercially available synthetic acid-treated mordenite (H—Zeolon, The Norton Company) was used as the starting material. One thousand grams of the synthetic mordenite (SiO2/Al2O3=11.67) were slurried in 8 liters of distilled water at reflux temperature. Three liters of an aqueous solution containing 435 grams of ammonium fluorosilicate was added rapidly to the zeolite-water slurry and the resultant mixture refluxed with stirring for 96 hours. The zeolite product was then isolated by filtration and washed with distilled water. The chemical and other analyses results are set forth below for the starting material and the product zeolite.

|  | H-Zeolon | LZ-211 Product |
|---|---|---|
| Na2O, wt. % | 0.48 | 0.32 |
| (NH4)2O, wt. % | — | 1.65 |
| Al2O3, wt. % | 12.44 | 6.48 |
| SiO2, wt. % | 85.51 | 91.88 |
| SiO2/Al2O3 (molar) | 11.67 | 24.08 |
| Na+/Al | 0.05 | 0.08 |
| NH4+/Al | — | 0.50 |
| Cation Equivalent, M+/Al | 0.06 | 0.58 |
| X-ray Crystallinity by Peak Intensity | 100 | 85 |
| Framework Infrared: |  |  |
| Asymmetric Stretch, cm$^{-1}$ | 1070 | 1093 |
| Symmetric Stretch, cm$^{-1}$ | 801 | 811 |
| Hydroxyl Infrared: |  |  |
| Absolute Abs. at 3710 cm$^{-1}$ | 0.185 | 0.245 |
| Defect Structure Factor, z | 0.078 | 0.104 |

Since the starting H—Zeolon contained a substantial number of defect sites, it is not necessary that the process substitute silicon into those defect sites. The fact that the process of this invention does not create any substantial amount of new defects in the structure is substantiated by the fact that the Defect Structure Factor, "z", increased by only 0.026 as a result of the treatment.

The framework mole fractions of tetrahedra are shown below for the starting H—Zeolon and the LZ-211 Product.

| (a) Mole fraction of oxides (TO2) |  |
|---|---|
| H—Zeolon | $(Al_{0.134}Si_{0.787}\square_{0.078})O_2$ |
| LZ-211 | $(Al_{0.069}Si_{0.827}\square_{0.104})O_2$ |
| (b) Mole fraction of aluminum removed, N | 0.065 |
| (c) % Aluminum Removed, N/a × 100 | 49 |
| (d) Change in Defect Structure Factor, $\Delta z$ | 0.026 |
| (e) Moles of silicon substituted per mole of aluminum removed, $\frac{N - \Delta z}{N}$ | 0.60 |

These data show quite conclusively that aluminum has been removed from the structure and replaced with silicon as a result of the fluorosilicate treatment. It is also apparent that the treatment conditions, particularly the rapid addition of the fluorosilicate solution to the zeolite, did not permit the insertion of silicon into all of the sites from which aluminum was removed during the treatment or into all of the aluminum depleted sites of the original H-Zeolon starting material. On the other hand, X-ray crystallinity was maintained, and while no exotherm due to crystal collapse was observed in either sample in differential thermal analyses, sintering began at about 1000° C. in the starting zeolite but did not occur until about 1150° C. in the product zeolite. The framework infrared spectra show shifts to higher wavenumbers following fluorosilicate treatment. The shift of both the asymmetric stretch band and the symmetric stretch band is characteristic of dealumination accompanied by silicon substitution in the framework. In the hydroxyl region of the infrared spectrum of the fluorosilicate treated zeolite there was no increase in the 3745 cm$^{-1}$ band due to occluded amorphous SiOH. There was only a small increase in absorbance at 3710 cm$^{-1}$ compared to the starting H—Zeolon indicating that there was only a small increase in the number of framework vacancies due to the treatment. It is to be noted, however, that moderating the severity of the treatment as illustrated in part (B) of the Example, below, results not only in the substantial replacement of aluminum atoms removed during the treatment, but also considerable filling of aluminum-vacant sites in the starting zeolite.

(B) In another example, 2500 grams of a similar H—Zeolon starting material as employed in part (A) was stirred in 5 liters of distilled water at 95° C. A second solution of 5 liters of distilled water containing 382.7 grams of ammonium fluorosilicate at a temperature of about 75° C. was added directly to the zeolite-water slurry at a rate of about 50–100 ml. per minute. During the addition period the temperature was maintained at 95° C. The stoichiometric ratio of moles of silicon added to the moles of aluminum present in the zeolite was 0.41. Follow completion of the addition of the fluorosilicate solution, the slurry was digested for 72 hours under reflux conditions, the solids recovered by filtration, and washed with distilled water. The chemical and other analyses results are set forth below:

There was a substantial decrease in absorbance at 3710 cm$^{-1}$ compared to the starting H-Zeolon indicating that there was a decrease in the number of framework vacancies or defect sites.

(C) To gain insight into the silicon substitution mechanism occurring during the treatment procedure in part (B) above, samples of the H—Zeolon were taken periodically during the course of treatment and analyzed. The results are shown below:

|  | Start of Addition of Ammonium fluorosilicate | End of Addition of Ammonium fluorosilicate | After 24 hours of digestion | After 48 hours of digestion | After 72 hours of digestion |
|---|---|---|---|---|---|
| X-ray Crystallinity: |  |  |  |  |  |
| (a) by Peak Intensity | 100 | 121 | 107 | 97 | 86 |
| (b) by Peak Area | 100 | 117 | 106 | 99 | 90 |
| Framework Infrared: |  |  |  |  |  |
| Asymmetric Stretch, cm$^{-1}$ | 1073 | 1085 | 1088 | 1085 | 1089 |
| Symmetric Stretch, cm$^{-1}$ | 801 | 813 | 814 | 815 | 815 |
| Hydroxyl Infrared: |  |  |  |  |  |
| Absolute Abs. at 3710 cm$^{-1}$ | 0.325 | 0.180 | 0.160 | 0.130 | 0.115 |
| Defect Structure Factor, z | 0.137 | 0.076 | 0.068 | 0.055 | 0.048 |

|  | H-Zeolon | LZ-211 Product |
|---|---|---|
| Na$_2$O, wt. % | 0.2 | 0.2 |
| (NH$_4$)$_2$O, wt. % | — | 2.1 |
| Al$_2$O$_3$, wt. % | 10.8 | 5.7 |
| SiO$_2$, wt. % | 88.8 | 91.4 |
| SiO$_2$/Al$_2$O$_3$ (molar) | 14.00 | 24.12 |
| Na$^+$/Al | 0.03 | 0.04 |
| NH$_4$$^+$/Al | — | 0.72 |
| Cation Equivalent, M$^+$/Al | 0.03 | 0.76 |
| X-ray Crystallinity: |  |  |
| (a) by Peak Intensity | 100 | 86 |
| (b) by Peak Area | 100 | 90 |
| Framework Infrared: |  |  |
| Asymmetric Stretch, cm$^{-1}$ | 1073 | 1089 |
| Symmetric Stretch, cm$^{-1}$ | 801 | 815 |
| Hydroxyl Infrared: |  |  |
| Absolute Abs. at 3710 cm$^{-1}$ | 0.325 | 0.115 |
| Defect Structure Factor, z | 0.137 | 0.048 |

In this example, the defect structure factor of the starting H—Zeolon is quite large. As a result of the treatment it would appear that a substantial number of the original defect sites have been eliminated. The framework mole fractions are set forth below for the starting H—Zeolon and the LZ-211 product.

| (a) Mole fraction of oxides (TO$_2$) |  |
|---|---|
| H-Zeolon | (Al$_{0.108}$Si$_{0.755}$□$_{0.137}$) |
| LZ-211 | (Al$_{0.073}$Si$_{0.879}$□$_{0.048}$) |
| (b) Mole fraction of aluminum removed, N | 0.035 |
| (c) % Aluminum depletion, N/a × 100 | 32 |
| (c) Change in defect structure, Δz | −0.089 |

From the data it is apparent that silicon atoms were substituted for aluminum atoms in the Zeolon structure. The framework infrared spectra show shifts to higher wavenumbers following the fluorosilicate treatment. The shift of both the asymmetric stretch band and the symmetric stretch band is characteristic of dealumination accompanied by silicon substitution in the framework. In the hydroxyl region of the infrared spectrum, the fluorosilicate treated sample shows no increase in absorbance at 3745 cm$^{-1}$ due to occluded SiOH species.

From the foregoing, it is apparent that a considerable amount of silicon substitution had taken place by the end of the fluorosilicate addition period.

EXAMPLE 8

Fluorosilicate Treatment of Mordenite, (a natural ore from Union Pass, Nev., United States).

One thousand gm (anhydrous weight) of a ground natural mordenite ore was added to 10 liters of 1.0N HCl solution in a 22 liter flask heated at 95° C. The slurry was stirred for one hour at 95° C., filtered and rinsed with 10 liters of distilled water. The acid exchange procedure was repeated twice more then the solids were washed with distilled water until the wash water remained clear when tested for the presence of chloride with AgNO$_3$ solution.

(a) Five hundred gm of the H$^+$ mordenite was slurried in 2 liters of distilled water at 75° C. A second solution of 1.5 liters of distilled water containing 100.12 gm (NH$_4$)$_2$SiF$_6$ was added in a continuous manner to the zeolite slurry at a rate of 10 ml per minute. The stoichiometric ratio of moles of Si added as [(NH$_4$)$_2$SiF$_6$] to the moles of Al present in the zeolite was 0.50. Following the addition of the fluorosilicate solution the slurry was digested for 26 hours under reflux conditions, then filtered and thoroughly washed until tests of the wash water proved negative for both aluminum and fluoride ions. The chemical analyses of the starting H$^+$ mordenite and the product of the fluorosilicate treatment are shown in Table 6A.

TABLE 6A

|  | Starting H$^+$ Mordenite | Treated H$^+$ Mordenite |
|---|---|---|
| Na$_2$O, wt. % | 0.29 | 0.22 |
| (NH$_4$)$_2$O, wt. % | — | 1.45 |
| Al$_2$O$_3$, wt. % | 11.46 | 8.18 |
| SiO$_2$, wt. % | 83.56 | 85.31 |
| F$_2$, wt. % | — | 2.35 |
| SiO$_2$/Al$_2$O$_3$ | 12.37 | 17.68 |
| Na$^+$/Al | 0.04 | 0.04 |
| NH$_4$$^+$/Al | — | 0.71 |
| Cation Equivalent, M$^+$/Al | 0.48 | 0.79 |

A comparison of the properties of the treated zeolite with the starting material is shown in Table 6B.

TABLE 6B

|  | Starting H+ Mordenite | Treated H+ Mordenite |
|---|---|---|
| Chemical $SiO_2/Al_2O_3$ | 12.37 | 17.68 |
| Chemical M+/Al | 0.48 | 0.79 |
| X-Ray Crystallinity |  |  |
| (I) By Peak Intensity | 100 | 89 |
| (II) By Peak Area | 100 | 75 |
| Crystal Collapse Temp., °C. (DTA) | ~1025 | No Exotherm |
| Framework Infrared |  |  |
| Asymmetric Stretch, $cm^{-1}$ | 1085 | 1098 |
| Symmetric Stretch, $cm^{-1}$ | 792 | 794 |
| Hydroxyl Infrared |  |  |
| Absolute Absorbance at 3710 $cm^{-1}$ | 0.225 | 0.310 |

The mole fractions of framework tetrahedra ($TO_2$) are set forth below in Table 6C for the starting H+—mordenite and the LZ-211 product.

TABLE 6C

| (a) Mole fraction of oxides ($TO_2$): | |
|---|---|
| H+-Mordenite | $(Al_{0.126}Si_{0.779}\square_{0.095})O_2$ |
| LZ-211 Product | $(Al_{0.088}Si_{0.781}\square_{0.131})O_2$ |
| (b) Mole fraction of aluminum removed; N | 0.038 |
| (c) % aluminum removed, N/a × 100 | 30 |
| (c) Change in defect structure factor, $\Delta z$ | 0.036 |
| (e) Moles of silicon substituted per mole of aluminum removed, (N-$\Delta z$)/N | 0.05 |

The analytical data in this case do not conclusively demonstrate that silicon has replaced aluminum in the mordenite framework although the X-ray crystallinity is maintained. However, because of the particle size of the mordenite crystals under study, it is difficult to obtain a high degree of infrared transmission through the zeolite wafer. The absorption bands in the framework infrared region are broader and less well defined than for instance with H—Zeolon. Nevertheless, it is obvious that the amount of shift of the asymmetric stretch band is substantially greater than the symmetric stretch band shift. This is characteristic of a zeolite framework that has been dealuminated with little or no silicon substitution in the vacant sites. However, the infrared spectrum of the hydroxyl region of the fluorosilicate treated sample did not show any increased absorbance at 3745 $cm^{-1}$ due to SiOH species. The increase in absorbance at 3710 $cm^{-1}$ due to hydrogen bonded OH groups in vacant sites did not increase commensurate with amount of aluminum removed during the treatment.

(b) A second sample of H+—mordenite weighing 317 gm (anhydrous weight) was slurried in 2 liters of distilled water at 75° C. A second solution of 1.5 liters distilled water containing 126.87 gm $(NH_4)_2SiF_6$ was added in a continuous manner to the zeolite slurry at a rate of 10 ml per minute. The stoichiometric ratio of moles of Si added as $[(NH_4)_2SiF_6]$ to the moles of Al present in the zeolite was 1.00. Following the addition of the fluorosilicate solution, the slurry was digested for 48 hours under reflux conditions then filtered and thoroughly washed until tests of the wash water proved negative for both aluminum and fluoride ions. The chemical analyses of the starting H+ mordenite and the product of the fluorosilicate treatment are shown in Table 7A, below:

TABLE 7A

|  | Starting H+ Mordenite | Treated H+ Mordenite |
|---|---|---|
| $Na_2O$, wt. % | 0.29 | 0.22 |
| $(NH_4)_2O$, wt. % | — | 1.35 |
| $Al_2O_3$, wt. % | 11.46 | 7.29 |
| $SiO_2$, wt. % | 83.56 | 86.77 |
| $F_2$, wt. % | — | 3.36 |
| $SiO_2/Al_2O_3$ | 12.37 | 12.20 |
| Na+/Al | 0.04 | 0.05 |
| $NH_4^+$/Al | — | 0.36 |
| Cation Equivalent, M+/Al | 0.48 | >0.80 |

A comparison of the properties of the treated zeolite with the starting H+ mordenite is shown in Table 7B, below:

TABLE 7B

|  | Starting H+ Mordenite | Treated H+ Mordenite |
|---|---|---|
| Chemical $SiO_2/Al_2O_3$ | 12.37 | 20.20 |
| Chemical M+/Al | 0.48 | 0.81 |
| X-Ray Crystallinity |  |  |
| (I) By Peak Intensity | 100 | 120 |
| (II) By Peak Area | 100 | 102 |
| Crystal Collapse Temp. °C. (DTA) | 1025 | No Exotherm |
| Framework Infrared |  |  |
| Asymmetric Stretch, $cm^{-1}$ | 1085 | NA |
| Symmetric Stretch, $cm^{-1}$ | 792 | NA |
| Hydroxyl Infrared |  |  |
| Absolute Absorbance at 3710 $cm^{-1}$ | 0.225 | 0.300 |

The mole fractions of framework tetrahedra ($TO_2$) are set forth for the starting H+—mordenite and the LZ-211 product in Table 7C below:

TABLE C

| (a) Mole fraction of Oxides, ($TO_2$) | |
|---|---|
| H+-mordenite | $(Al_{0.126}Si_{0.779}\square_{0.095})O_1$ |
| LZ-211 | $(Al_{0.079}Si_{0.794}\square_{0.127})O_2$ |
| (b) Mole fraction of aluminum removed, N; | 0.047 |
| (c) % Framework aluminum removed, N/a × 100 | 37 |
| (d) Change in defect structure factor, $\Delta z$ | 0.032 |
| (e) Moles of silicon substituted per mole of aluminum removed, (N-$\Delta z$/N) | 0.32 |

As in the case of the preceding Example, proof of silicon substitution rests primarily on chemical analysis and absolute absorbance measurements in the hydroxyl stretching region of the infrared spectrum (3710 $cm^{-1}$). The X-ray crystalinity was maintained. The peak area measurement shows the same value as the starting H+—mordenite and the peak intensity measurement indicates an increase in intensity due to peak sharpening. This suggests a more ordered structure than the starting H+—mordenite, the exact nature of which is not known at this time. The calculated unit cell values make it quite certain that a substantial amount of silicon has replaced aluminum in the framework. This alone could be the cause of increased intensity measurements in the X-ray powder pattern. A sample taken after 24 hours of the fluorosilicate treatment had a $SiO_2/Al_2O_3$ ratio of 19.1, a fluoride content of 3.5 wt.% and absolute absorbance at 3710 $cm^{-1}$ of 0.330. Comparing this sample to the sample described in Tables 6A, B and C, supra increasing the amount of fluorosilicate in the treatment step increases the amount of silicon substitution. Increasing the digestion time also increased the degree of silicon substitution. It is apparently more difficult to substitute silicon into the framework structure of natural mordenite than it is to substitute it into the framework of synthetic mordenite.

EXAMPLE 9

Fluorosilicate Treatment of $NH_4^+$—L Zeolite to Produce LZ-212.

(a) Fifty gm of NaKL zeolite ($SiO_2/Al_2O_3$ molar ratio of 6.03) was slurried with 500 ml of 1.0 molar $NH_4Cl$ solution at reflux for 16 hours and filtered. The exchange was repeated three times more and the product of the third exchange was washed with hot distilled water until tests of the wash water were negative when tested for chloride with $AgNO_3$ solution From the product 10.0 gm (anhydrous weight) was slurried in 100 ml of distilled water heated at 75° C. A second solution of 50 ml containing 3.36 gm $(NH_4)_2SiF_6$ was added to the $NH_4L$—water slurry in 1 ml increments at a rate of 1 ml every five minutes. During the course of the fluorosilicate addition the temperature was maintained at 75° C. The stoichiometric ratio of moles of Si added as $[(NH_4)_2SiF_6]$ to the moles of Al present in the zeolite was 0.50. Following addition of the fluorosilicate solution the slurry was heated to 95° C. for 16 hours, then filtered and thoroughly washed until tests of the wash water proved negative for both aluminum and fluoride ions. The chemical analyses for the starting $NH_4L$ and the product of the fluorosilicate treatment are shown in Table 8A, below:

TABLE 8A

|  | Starting NH4L | LZ-212 Product |
| --- | --- | --- |
| K2O wt. % | 3.43 | 2.03 |
| (NH4)2O, wt. % | 8.35 | 3.46 |
| Al2O3, wt. % | 19.22 | 11.15 |
| SiO2, wt. % | 68.31 | 81.38 |
| F2, wt. % | — | 0.04 |
| SiO2/Al2O3 | 6.03 | 12.39 |
| K+/Al | 0.19 | 0.47 |
| NH4+/Al | 0.85 | 0.61 |
| Cation Equivalent, M+/Al | 1.04 | 1.08 |

A comparison of the properties of the treated zeolite with the starting material is shown in Table 8B.

TABLE 8B

|  | Starting NH4L | LZ-212 Product |
| --- | --- | --- |
| Chemical SiO2/Al2O3 | 6.03 | 12.39 |
| Chemical M+/Al | 1.05 | 1.08 |
| X-Ray Crystallinity |  |  |
| (I) By Peak Intensity | 100 | Excellent |
| (II) By Peak Area | NA | NA |
| Crystal Collapse Temp., °C. (DTA) | 900 | 950 |
| Framework Infrared |  |  |
| Asymmetric Stretch, cm−1 | 1028 | 1109 |
| Symmetric Stretch, cm−1 | 769 | 782 |
| Hydroxyl Infrared |  |  |
| Absolute Absorbance at 3170 cm−1 | 0.085 | 0.195 |

The framework mole fractions are set forth in Table 8C below for the starting $NH_4L$ and the LZ-212 product.

TABLE 8C

| (a) Mole fraction of oxides (TO2): | |
| --- | --- |
| NH4L | (Al0.240Si0.724☐0.036)O2 |
| LZ-212 | (Al0.128Si0.790☐0.082)O2 |
| (b) Mole fraction of aluminum removed, N; | 0.112 |
| (c) Percent of framework aluminum removed, N/a × 100 | 47 |
| (d) Change in defect structure factor, Δz | 0.046 |
| (e) Moles of silicon substituted per mole of | 0.57 |

TABLE 8C-continued aluminum removed, (N-Δz)/N

The data show quite conclusively that under the conditions given, silicon substitutes for aluminum in the L zeolite framework with a high degree of efficiency. X-ray crystallinity is maintained and the thermal stability is apparently increased. More importantly, both the asymmetric stretch band and the symmetric stretch band in the framework infrared spectra increase following the treatment. This is a consistent with dealumination accompanied by silicon substitution in the framework. No absorption was observed at 3745 cm−1 due to occluded SiOH species and there is only a small increase in absolute absorbance at 3710 cm−1 which reflects the relative amount of hydrogen bonded OH groups in framework vacancies. Dealumination was nearly stoichiometric with the amount of fluorosilicate added.

(b) In a second experiment a fresh sample of NaKL was obtained. Three hundred and seventy-two gm of NaKL zeolite ($SiO_2/Al_2O_3$ molar ratio of 5.93) was slurried with 1000 ml of 6 molar $NH_4Cl$ solution at reflux for 16 hours and filtered. The exchange was repeated twice more and the product of the third exchange was washed with hot distilled water until tests of the wash water were negative when tested for chloride with $AgNO_3$ solution.

From the ammonium-exchanged product 100 gm (anhydrous weight) was slurried in 300 ml of distilled water heated at 75° C. A second solution of 300 ml containing 33.94 gm $(NH_4)_2SiF_6$ was added to the $NH_4L$—water slurry in 10 ml increments at rate of 10 ml every five minutes. During the course of the fluorosilicate addition the temperature was maintained at 75° C. The stoichiometric ratio of moles of Si added as $[(NH_4)_2SiF_6]$ to the moles of Al present in the zeolite was 0.50. Following addition of the fluorosilicate solution the slurry was maintained at 75° C. and digested for 24 hours, then filtered and thoroughly washed until tests of the wash water proved negative for both aluminum and fluoride ions. The chemical analyses for the starting $NH_4L$ and the product of the fluorosilicate treatment are shown in Table 9A.

TABLE 9A

|  | Starting NH4L | LZ-212 |
| --- | --- | --- |
| K2O, wt. % | 3.51 | 2.66 |
| (NH4)2O, wt. % | 7.89 | 4.10 |
| Al2O3, wt. % | 19.42 | 11.52 |
| SiO2, wt. % | 67.80 | 79.62 |
| F2, wt. % | — | 0.08 |
| SiO2/Al2O3 | 5.92 | 11.73 |
| K+/Al | 0.20 | 0.25 |
| NH4+/Al | 0.80 | 0.70 |
| Cation Equivalent, M+/Al | 1.00 | 0.95 |

A comparison of the properties of the treated zeolite with the starting $NH_4L$ is shown in Table 9B.

TABLE 9B

|  | Starting NH4L | LZ-212 |
| --- | --- | --- |
| Chemical SiO2/Al2O3 | 5.92 | 11.73 |
| Chemical M+/Al | 1.00 | 0.95 |
| X-ray Crystallinity |  |  |
| (I) By Peak Intensity | 100 | 49 |
| (II) By Peak Area | 100 | 52 |
| Crystal Collapse Tem., °C. (DTA) | 995 | 940 |
| Framework Infrared |  |  |

TABLE 9B-continued

|  | Starting NH$_4$L | LZ-212 |
|---|---|---|
| Asymmetric Stretch, cm$^{-1}$ | 1028 | 1108, 1031 |
| Symmetric Stretch, cm$^{-1}$ | 768 | 780 |
| Hydroxyl Infrared |  |  |
| Absolute Absorbance at 3710 cm$^{-1}$ | 0.048 | 0.240 |

The framework mole fractions are set forth below in Table 9C for the starting NH$_4$L and the LZ-212 product.

TABLE 9C

| (a) Mole fraction of oxides (TO$_2$): | |
|---|---|
| NH$_4$L | (Al$_{0.247}$Si$_{0.733}$☐$_{0.020}$)O$_2$ |
| LZ-212 | (Al$_{0.131}$Si$_{0.767}$☐$_{0.102}$)O$_2$ |
| (b) Mole fraction of aluminum removed, N; | 0.116 |
| (c) Percent of framework aluminum removed, N/a × 100 | 47 |
| (d) Change in defect structure factor, Δz | 0.082 |
| (e) Moles of silicon substituted per mole of aluminum removed, (N-Δz)/N | 0.29 |

It should be noted that the fluorosilicate digestion temperature in the present example was 75° C. while that in the previous example was at reflux. The degree of dealumination is the same for both digestion temperatures while the efficiency of silicon substitution is substantially reduced at the lower digestion temperature.

EXAMPLE 10

Fluorosilicate Treatment of Clinoptilolite to Produce LZ-219.

Twenty-five gm. of the natural mineral clinoptilolite (SiO$_2$/Al$_2$O$_3$ molar ratio of 10.3) was slurried with 200 ml. of 1M. NH$_4$Cl solution at reflux for one hour and filtered. The exchange was repeated twice more and the product of the third exchange was washed with hot distilled water until tests of the wash water showed negative for chloride.

From the ammonium-exchanged product, 5.0 gm (anhydrous weight) was slurried in 100 ml of distilled water heated at 95° C. A second solution of 50 ml containing 1.17 gm (NH$_4$)$_2$SiF$_6$ was added to the slurry in 2 ml increments at a rate of 2 ml. per 5 minutes. The stochiometric ratio of moles of Si added as [(NH$_4$)$_2$SiF$_6$] to the moles of Al in the zeolite was 0.5. Following the addition of the fluorosilicate solution the slurry was digested for three hours at 95° C. then thoroughly washed until tests of the wash water proved negative for both aluminum and fluoride ions. The chemical analyses for the starting NH$_4$ Clinoptilolite and the product of the fluorosilicate treatment are shown in Table 10A, below:

TABLE 10A

|  | Starting NH$_4$ Clinoptilolite | Product |
|---|---|---|
| Na$_2$O, wt. % | 0.55 | 0.66 |
| (NH$_4$)$_2$O, wt. % | 5.19 | 3.85 |
| Al$_2$O$_3$, wt. % | 12.82 | 11.33 |
| SiO$_2$, wt. % | 77.90 | 81.41 |
| F$_2$, wt. % | — | 0.53 |
| SiO$_2$/Al$_2$O$_3$ | 10.31 | 12.20 |
| Na$^+$/Al | 0.07 | 0.10 |
| NH$_4$$^+$/Al | 0.79 | 0.67 |
| Cation Equivalent, M$^+$/Al | 0.93 | 0.82 |

A comparison of the properties of the treated zeolite with the starting material is shown in Table 10B, below:

TABLE 10B

|  | Starting NH$_4$ Clinoptilolite | Treated NH$_4$ Clinoptilolite |
|---|---|---|
| Chemical SiO$_2$/Al$_2$O$_3$ | 10.31 | 12.20 |
| Chemical M$^+$/Al | 0.93 | 0.83 |
| X-Ray Crystallinity |  |  |
| (I) By Peak Intensity | 100 | 60 |
| (II) By Peak Area | 100 | 60 |
| Crystal Collapse Temp., °C. (DTA) | 530 | 533 |
| Framework Infrared |  |  |
| Asymmetric Stretch, cm$^{-1}$ | 1062 | 1086 |
| Symmetric Stretch, cm$^{-1}$ | 795, 778 | 796, 778 |
| Hydroxyl Infrared |  |  |
| Absolute Absorbance at 3710 cm$^{-1}$ | 0.055 | 0.135 |

The framework mole fractions are set forth in Table 10C below for the starting NH$_4$—Clinoptilolite and the product.

TABLE 10C

| (a) Mole fraction of oxides (TO$_2$): | |
|---|---|
| NH$_4$ Clino. | (Al$_{0.159}$Si$_{0.818}$☐$_{0.023}$)O$_2$ |
| Product | (Al$_{0.133}$Si$_{0.810}$☐$_{0.057}$)O$_2$ |
| (b) Mole fraction of aluminum removed, N; | 0.026 |
| (c) % of framework aluminum removed; N/a × 100 | 16 |
| (d) Change in defect structure factor, Δz | 0.034 |

From the data it would appear that mainly dealumination resulted from the treatment of NH$_4$ Clinoptilolite with the (NH$_4$)$_2$SiF$_6$ at 95° C. However the efficiency of dealumination is low, indicating that the sites in the framework where the aluminum atoms are located are relatively inaccessible, or that aluminum atoms in the particular environment of the clinoptilolite framework are extremely stable. Accordingly when the experiment is repeated using more rigorous conditions, preferred LZ-219 products within the scope of the preferred compositions of the present invention are formed.

EXAMPLE 11

Fluorosilicate Treatment of Chabazite to Produce LZ-218

Twenty-five grams of the natural mineral chabazite (SiO$_2$/Al$_2$O$_3$ molar ratio of 8.5) was slurried with 200 ml of 2 molar NH$_4$Cl solution at reflux for one hour and filtered. The exchange was repeated twice more and the product of the third exchange was washed with hot distilled water until tests of the wash water showed negative for chloride.

From the ammonium exchanged product, 5.0 gm (anhydrous weight) was slurried in 100 ml of distilled water heated at 95° C. A second solution of 50 ml containing 2.60 gm (NH$_4$)$_2$SiF$_6$ was added to the slurry in 2 ml increments at a rate of 2 ml per five minutes. The stoichiometric ratio of moles of silicon added as [(NH$_4$)$_2$SiF$_6$] to the moles of aluminum present in the zeolite was 1.00. Following the addition of the fluorosilicate solution the slurry was digested for three hours at 95° C. then thoroughly washed until tests of the wash water proved negative for both aluminum and fluoride ions. The chemical analyses for the starting NH$_4$ chabazite and the product of the fluorosilicate treatment are shown in Table 11A, below:

TABLE 11A

|  | Starting NH$_4$ Chabazite | LZ-218 Product |
|---|---|---|
| Na$_2$O, wt. % | NA | 0.85 |

TABLE 11A-continued

|  | Starting NH$_4$ Chabazite | LZ-218 Product |
|---|---|---|
| (NH$_4$)$_2$O, wt. % | 4.98 | 3.30 |
| Al$_2$O$_3$, wt. % | 14.83 | 12.05 |
| SiO$_2$, wt. % | 74.51 | 78.98 |
| F$_2$, wt. % | NA | 0.39 |
| SiO$_2$/Al$_2$O$_3$ | 8.52 | 11.13 |
| Na$^+$/Al | NA | 0.12 |
| NH$_4^+$/Al | 0.66 | 0.54 |
| Cation Equivalent, M$^+$/Al | 0.66 | 0.94 |

A comparison of the properties of the treated zeolite with the starting material is shown in Table 11B, below:

TABLE 11B

|  | Starting NH$_4$ Chabazite | LZ-218 Product |
|---|---|---|
| Chemical SiO$_2$/Al$_2$O$_3$ | 8.52 | 11.13 |
| Chemical M$^+$/Al | 0.69 | 0.94 |
| X-Ray Crystallinity |  |  |
| (I) By Peak Intensity | 100 | 164 |
| (II) By Peak Area | 100 | 106 |
| Crystal Collapse Temp., °C. (DTA) | Sinter 940° C. | Exotherm 930° C. |
| Framework Infrared |  |  |
| Asymmetric Stretch, cm$^{-1}$ | 1042 | 1096 |
| Symmetric Stretch, cm$^{-1}$ | 771 | 785 |
| Hydroxyl Infrared |  |  |
| Absolute Absorbance at 3710 cm$^{-1}$ | 0.075 | 0.145 |

The framework mole fractions are set forth in Table 11C below for the starting NH$_4$ chabazite and the LZ-218 products.

TABLE 11C

| (a) Mole fraction of framework oxides (TO$_2$): |  |
|---|---|
| NH$_4$ Chabazite | (Al$_{0.184}$Si$_{0.784}$☐$_{0.032}$)O$_2$ |
| LZ-218 | (Al$_{0.143}$Si$_{0.795}$☐$_{0.062}$)O$_2$ |
| (b) Mole fraction of aluminum removed, N | 0.041 |
| (c) % framework aluminum removed; N/a × 100 | 22 |
| (d) Change in defect structure factor, Δz, | 0.030 |
| (e) Moles of silicon substituted per mole of aluminum removed; (N-Δz)/N | 0.27 |

The data indicate that silicon has replaced aluminum in the chabazite framework. The efficiency of aluminum removal is relatively low compared with the Y, L and mordenite zeolites, and comparable to that observed in the case of clinoptilolite. However with chabazite, silicon does replace the removed aluminum in the framework as shown by the shift of both the asymmetric stretch band and the symmetric stretch band of the framework infrared spectrum to higher wavenumbers. Additionally, no evidence was found to indicate occlusion of amorphous SiOH species which would account for the increased silicon content in the zeolite. The increase in X-ray peak intensity while the peak area remains constant is taken as further evidence of silicon substitution in the framework.

EXAMPLE 12

Fluorosilicate Treatment of Erionite to Produce LZ-220.

A 5.0 gm (anhydrous weight) sample of an ammonium exchanged natural erionite was slurried in 100 ml. of distilled water heated at 95° C. A second solution of 50 ml containing 1.60 gm (NH$_4$)$_2$SiF$_6$ was added to the slurry in 2 ml increments at a rate of 2 ml per minute. The stoichiometric ratio of moles of Si added as [(NH$_4$)$_2$SiF$_6$] to the moles of Al present in the zeolite was 0.54. Following the addition of the fluorosilicate solution the slurry was digested for three hours at 95° C. then thoroughly washed until tests of the wash water proved negative for both aluminum and fluoride ions. The chemical analyses for the starting NH$_4$ Erionite and the product of the fluorosilicate treatment are shown in Table 12A, below:

TABLE 12A

|  | Starting NH$_4$ Erionite | Product LZ-220 |
|---|---|---|
| Na$_2$O, wt. % | 0.35 | 0.24 |
| (NH$_4$)$_2$O, wt. % | 5.75 | 3.54 |
| Al$_2$O$_3$, wt. % | 16.80 | 13.24 |
| SiO$_2$, wt. % | 68.93 | 76.26 |
| F$_2$, Wt. % | — | 0.39 |
| SiO$_2$/Al$_2$O$_3$ | 6.96 | 9.77 |
| Na$^+$/Al | 0.03 | 0.03 |
| NH$_4^+$/Al | 0.67 | 0.52 |
| Cation Equivalent, M$^+$/Al | 0.91 | 0.79 |

A comparison of the properties of the treated zeolite with the starting material is shown in Table 12B, below:

TABLE 12B

|  | Starting NH$_4$ Erionite | Product LZ-220 |
|---|---|---|
| Chemical SiO$_2$/Al$_2$O$_3$ | 6.96 | 9.77 |
| Chemical M$^+$/Al | 0.91 | 0.79 |
| X-Ray Crystallinity |  |  |
| (I) By Peak Intensity | 100 | 172 |
| (II) By Peak Area | 100 | 150 |
| Crystal Collapse Temp., °C. (DTA) | 976 | 995 |
| Framework Infrared |  |  |
| Asymmetric Stretch, cm$^{-1}$ | 1052 | 1081 |
| Symmetric Stretch, cm$^{-1}$ | 781 | 784 |
| Hydroxyl Infrared |  |  |
| Absolute Absorbance at 3710 cm$^{-1}$ | 0.070 | 0.160 |

The framework mole fractions are set forth in Table 12C below for the starting NH$_4$—Erionite and the product zeolite.

TABLE 12C

| (a) Mole fraction of framework oxides, (TO$_2$): |  |
|---|---|
| NH$_4$ Erionite | (Al$_{0.217}$Si$_{0.753}$☐$_{0.030}$)O$_2$ |
| Product LZ-220 | (Al$_{0.158}$Si$_{0.774}$☐$_{0.068}$)O$_2$ |
| (b) Mole fraction of aluminum removed, N | 0.059 |
| (c) % of framework aluminum removed, N/a × 100 | 27 |
| (d) Change in defect structure factor, Δz | 0.038 |
| (e) Moles of silicon substituted per mole of aluminum removed, (N-Δz)/N | 0.36 |

The data establish the feasibility of substituting silicon for framework aluminum in erionite by the method of the present invention. Using the conditions described, however, the efficiency of aluminum removal and of silicon substitution are relatively low. Using more rigorous reaction conditions results in the formation of a preferred LZ-220 product within the scope of the novel compositions of the invention.

EXAMPLE 13

Fluorosilicate Treatment of Offretite to Produce LZ-217.

Approximately 50 grams of synthetic TMA offretite was slowly calcined to 550° C. and held 24 hours. The calcined offretite ($SiO_2/Al_2O_3$ molar ratio of 9.2) was slurried with 300 ml of 1.3 molar $NH_4Cl$ solution at reflux for one hour and filtered. The exchange was repeated twice more and the product of the third exchange was washed with hot distilled water until tests of the wash water showed negative for chloride.

From the ammonium exchanged product, 5.0 gm (anhydrous weight) was slurried in 100 ml of distilled water heated at 95° C. A second solution of 50 ml containing 1.25 gm $(NH_4)_2SiF_6$ was added to the slurry in 2 ml increments at a rate of 2 ml per five minutes. The stoichiometric ratio of moles of silicon added as $[(NH_4)_2SiF_6]$ to the moles of aluminum present in the zeolite was 0.51. Following the addition of the fluorosilicate solution the slurry was digested for three hours at 95° C. then thoroughly washed until tests of the wash water proved negative for both aluminum and fluoride ions. The chemical analyses for the starting $NH_4$ Offretite and the product of the fluorosilicate treatment are shown in Table 13A, below:

TABLE 13A

|  | Starting NH$_4$-Offretite | LZ-217 Product |
|---|---|---|
| K$_2$O, wt. % | 2.48 | 1.47 |
| (NH$_4$)$_2$O, wt. % | 5.31 | 2.72 |
| Al$_2$O$_3$, wt. % | 14.05 | 8.27 |
| SiO$_2$, wt. % | 76.15 | 84.71 |
| F$_2$, wt. % | — | 0.12 |
| SiO$_2$/Al$_2$O$_3$ | 9.20 | 17.38 |
| K$^+$/Al | 0.19 | 0.19 |
| NH$_4{}^+$/Al | 0.74 | 0.64 |
| Cation Equivalent, M$^+$/Al | 0.93 | 0.84 |

A comparison of the properties of the treated zeolite with the starting material is shown in Table 13B, below:

TABLE 13B

|  | Starting NH$_4$-Offretite | LZ-217 Product |
|---|---|---|
| Chemical SiO$_2$/Al$_2$O$_3$ | 9.20 | 17.38 |
| Chemical M$^+$/Al | 0.93 | 0.84 |
| X-Ray Crystallinity |  |  |
| (I) By Peak Intensity | 100 | 59 |
| (II) By Peak Area | 100 | 60 |
| Crystal Collapse Temp., °C. (DTA) | 1001 | 1043 |
| Framework Infrared |  |  |
| Asymmetric Stretch, cm$^{-1}$ | 1083 | 1094 |
| Symmetric Stretch, cm$^{-1}$ | 789 | 793 |
| Hydroxyl Infrared |  |  |
| Absolute Absorbance at 3710 cm$^{-1}$ | 0.140 | 0.239 |

The framework mole fractions are set forth in Table 13C below for the starting NH$_4$ offretite and the LZ-217 product.

TABLE 13C

| (a) Mole fraction of framework oxides (TO$_2$): |  |
|---|---|
| NH$_4$ Offretite | (Al$_{0.168}$Si$_{0.773}$□$_{0.059}$)O$_2$ |
| LZ-217 | (Al$_{0.093}$Si$_{0.806}$□$_{0.101}$)O$_2$ |
| (b) Mole fraction of aluminum removed; N | 0.075 |
| (c) % framework aluminum removed; N/a × 100 | 45 |

TABLE 13C-continued

| (d) Change in defect structure factor, Δz | 0.042 |
|---|---|
| (e) Moles of silicon substituted per mole of aluminum removed, (N-Δz)/N | 0.44 |

The data show that dealumination and silicon substitution do occur in the erionite framework as a result of the fluorosilicate treatment. Some degradation of the structure seems apparent from the X-ray crystallinity data. However, oxygen adsorption values for the starting NH$_4$ Offretite and the treated product are nearly identical (16–17 wt.% O$_2$ at 100 Torr and −183° C.). The efficiency of dealumination under the described conditions is quite high and the efficiency of silicon substitution can be increased with longer digestion times.

EXAMPLE 14

Fluorosilicate Treatment of Zeolite W.

Eight gm of synthetic zeolite W (SiO$_2$/Al$_2$O$_3$ molar ratio of 3.66) was slurried in 100 ml of 1.1 molar NH$_4$Cl solution at reflux for one hour and filtered. The exchange was repeated twice more, the third and final exchange being carried out over 16 hours. The product was then washed with hot distilled water until tests of the wash water showed negative for chloride.

From the NH$_4$W product, 5.0 gm (anhydrous weight) was slurried in 100 ml distilled water heated at 95° C. A second solution of 50 ml containing 2.21 gm (NH$_4$)$_2$SiF$_6$ was added to the slurry in 2 ml increments at a rate of 2 ml every five minutes. During the course of the fluorosilicate addition the slurry temperature was maintained at 95° C. The stoichiometric ratio of moles of Si added as [(NH$_4$)$_2$SiF$_6$] to the moles of Al present in the zeolite was 0.49. Following addition of the fluorosilicate solution, the slurry was digested for three hours at 95° C. then filtered and thoroughly washed until tests of the wash water proved negative for both aluminum and fluoride ions. The chemical analyses for the starting NH$_4$W and the product of the fluorosilicate treatment are shown in Table 14A, below:

TABLE 14A

|  | Starting NH$_4$W | Treated NH$_4$W |
|---|---|---|
| K$_2$O, wt. % | 0.81 | 0.57 |
| (NH$_4$)$_2$O, wt. % | 11.37 | 4.19 |
| Al$_2$O$_3$, wt. % | 25.99 | 11.88 |
| SiO$_2$, wt. % | 59.40 | 81.67 |
| F$_2$, wt. % | — | 0.62 |
| SiO$_2$/Al$_2$O$_3$ | 3.88 | 11.67 |
| K$^+$/Al | 0.03 | 0.05 |
| NH$_4{}^+$/Al | 0.86 | 0.69 |
| Cation Equivalent, M$^+$/Al | 0.89 | 0.79 |

A comparison of the properties of the treated zeolite with the starting material is shown in Table 14B, below:

TABLE 14B

|  | Starting NH$_4$W | Treated NH$_4$W |
|---|---|---|
| Chemical SiO$_2$/Al$_2$O$_3$ | 3.88 | 11.67 |
| Chemical M$^+$/Al | 0.89 | 0.79 |
| X-Ray Crystallinity |  |  |
| (I) By Peak Intensity | 100 | 37 |
| (II) By Peak Area | 100 | 35 |
| Unit Cell (a$_o$) in A | 20.206 | 20.145 |
| Crystal Collapse Temp., °C. (DTA) | 1031 | 1025 |
| Framework Infrared |  |  |

TABLE 14B-continued

| | Starting NH$_4$W | Treated NH$_4$W |
|---|---|---|
| Asymmetric Stretch, cm$^{-1}$ | 1020 | 1084 |
| Symmetric Stretch, cm$^{-1}$ | 780 | 788 |
| Hydroxyl Infrared | | |
| Absolute Absorbance at 3710 cm$^{-1}$ | 0.075 | 0.310 |

The framework mole fractions are set forth in Table 14C below for the starting NH$_4$W and the product zeolite.

TABLE 14C

| | |
|---|---|
| (a) Mole fraction of framework oxides (TO$_2$); | |
| NH$_4$W | (Al$_{0.329}$Si$_{0.639}$□$_{0.032}$)O$_2$ |
| Product | (Al$_{0.127}$Si$_{0.741}$□$_{0.131}$)O$_2$ |
| (b) Mole fraction of aluminum removed; N | 0.202 |
| (c) % of framework aluminum removed; N/a × 100 | .61 |
| (d) Change in defect structure factor; Δz | 0.099 |
| (e) Mole of silicon substituted per mole of aluminum removed; (N-Δz)/N | 0.51 |

The data establishes the feasibility of substituting silicon for framework aluminum in zeolite W using the process of the present invention. The X-ray crystallinity data coupled with some preliminary adsorption data, however, indicate that an undue amount of crystal degradation occurred using the specified reaction conditions, with the consequent production of a zeolite which does not qualify as preferred LZ-216. Evidence for silicon substitution is established by the shift of framework infrared absorption bands to higher wavenumbers and the relative size of the broad absorption band in the hydroxyl region of the infrared spectrum which does not correlate well with the high level of dealumination. Chemical analysis data of both the solid and the liquid phases of the reaction showed that silicon was indeed incorporated into the zeolite. With no increased absorbance at 3745 cm$^{-1}$ of the infrared spectrum indicative of amorphous SiOH species as additional evidence, it must be concluded that silicon was incorporated into the zeolite framework during the treatment.

The cause of the structure degradation is believed to be the extensive dealumination of the framework without adequate silicon substitution. Accordingly the reaction should, in order to produce LZ-216, be carried out in the presence of a buffer solution such as ammonium acetate. As a general proposition the higher the aluminum content of the starting zeolite, the greater the need for buffering. When this is done, preferred LZ-216 results as the product.

EXAMPLE 15

Fluorosilicate Treatment of Zeolite Rho.

A sample of NH$_4$Rho zeolite which contained a sparingly soluble chloride salt was extracted for a period of eight days in a Soxhlet extraction apparatus. From the washed NH$_4$ Rho zeolite 25.0 gm (anhydrous weight) was slurried in 200 ml distilled water heated at 75° C. A second solution of 100 ml containing 8.5 gm (NH$_4$)$_2$SiF$_6$ was added to the slurry in 3 ml increments at a rate of 3 ml every five minutes. During the course of the fluorosilicate addition the slurry temperature was maintained at 75° C. The stoichiometric ratio of moles of Si added as [(NH$_4$)$_2$SiF$_6$] to the moles of Al present in the zeolite was 0.50. Following addition of the fluorosilicate solution, the slurry was digested for 24 hours at 75° C. then filtered and thoroughly washed until tests of the wash water proved negative for both aluminum and fluoride ions. The chemical analyses for the starting NH$_4$ Rho and the product of the fluorosilicate treatment are shown in Table 15A, below:

TABLE 15A

| | Starting NH$_4$-Rho | Treated NH$_4$-Rho |
|---|---|---|
| Cs$_2$O, wt. % | 3.02 | 2.07 |
| (NH$_4$)$_2$O, wt. % | 9.53 | 4.48 |
| Al$_2$O$_3$, wt. % | 19.30 | 11.03 |
| SiO$_2$, wt. % | 67.33 | 80.34 |
| F$_2$, wt. % | — | 0.08 |
| SiO$_2$/Al$_2$O$_3$ | 5.92 | 12.36 |
| Cs/Al | 0.06 | 0.07 |
| NH$_4^+$/Al | 0.81 | 0.80 |
| Cation Equivalent, M$^+$/Al | 0.87 | 0.86 |

A comparison of the properties of the treated zeolite with the starting NH$_4$ Rho is shown in Table 15B, below:

TABLE 15B

| | Starting NH$_4$-Rho | Treated NH$_4$-Rho |
|---|---|---|
| Chemical SiO$_2$/Al$_2$O$_3$ | 5.92 | 12.36 |
| Chemical M$^+$/Al | 0.87 | 0.86 |
| X-Ray Crystallinity | | |
| (I) By Peak Intensity | 100 | 70 |
| (II) By Peak Area | 100 | 70 |
| Unit Cell (a$_o$) in Å | 14.991 | 14.927 |
| Crystal Collapse Temp., °C. (DTA) | 975 | 975, 1165 |
| Framework Infrared | | |
| Asymmetric Stretch, cm$^{-1}$ | 1049 | 1100, 1055 |
| Symmetric Stretch, cm$^{-1}$ | 801 | 800 |
| Hydroxyl Infrared | | |
| Absolute Absorbance at 3710 cm$^{-1}$ | 0.075 | 0.340 |

The framework tetrahedral mole fractions are set forth in Table 15C below for both the starting NH$_4$ Rho and the product zeolite.

TABLE 15C

| | |
|---|---|
| (a) Mole fraction of framework oxides (TO$_2$); | |
| NH$_4$Rho | (Al$_{0.245}$Si$_{0.724}$□$_{0.031}$)O$_2$ |
| Product | (Al$_{0.119}$Si$_{0.737}$□$_{0.144}$)O$_2$ |
| (b) Mole fraction of aluminum removed; N | 0.126 |
| (c) % framework aluminum removed; N/a × 100 | 51 |
| (d) Change in defect structure factor; Δz | 0.113 |
| (e) Moles of silicon substituted per mole of aluminum removed; (N-Δz)/N | 0.10 |

From the calculated unit cell compositions it appears that a relatively small amount of silicon was incorporated into the zeolite Rho framework during the treatment. This is consistent with the very large shift of the asymmetric stretch absorption band of the framework infrared region and the lack of shift for the symmetric stretch band. The efficiency of dealumination is high but under the conditions employed, the efficiency of silicon substitution is low. A LZ-214 product within the scope of the preferred novel compositions of this invention and having the characteristic crystal structure of zeolite Rho is produced by digesting at a higher temperature and employing additional buffering agents to protect the zeolite from acid attack.

EXAMPLE 16

Preparation of LZ-210.

Ten gm. (anhydrous weight) of ammonium zeolite Y ($SiO_2/Al_2O_3$ molar ratio = 4.93) were slurried in 100 ml of 3.4 molar ammonium acetate solution at 75° C. A 50 ml solution of water containing 4.63 gm $Li_2SiF_6.2H_2O$ was added to the zeolite slurry in 1 ml increments at an addition rate of 1 ml. every 5 minutes. Following addition of the $Li_2SiF_6$ solution, the reaction mixture was digested 17 hours at 75° C., with stirring. After the digestion period the reaction mixture was filtered and the filter cake thoroughly washed with distilled $H_2O$ until tests of the wash water proved negative for both fluoride and aluminum ions. The product was dried two hours at 110° C. in air. The chemical and other analyses for the starting $NH_4Y$ zeolite and the LZ-210 product zeolite are set forth below.

|  | $NH_4Y$ | LZ-210 Product |
|---|---|---|
| $Na_2O$ wt. % | 2.5 | 0.6 |
| $(NH_4)_2O$ wt. % | 9.5 | 3.7 |
| $Li_2O$ wt. % | — | 0.4 |
| $Al_2O_3$ wt. % | 22.2 | 9.7 |
| $SiO_2$ wt. % | 64.4 | 85.0 |
| $SiO_2/Al_2O_3$ (molar) | 4.93 | 14.80 |
| $Na^+/Al$ | 0.19 | 0.10 |
| $NH_4^+/Al$ | 0.84 | 0.74 |
| $Li^+/Al$ | — | 0.13 |
| Cation Equivalent ($M^+/Al$) | 1.03 | 0.98 |
| X-Ray Crystallinity: | | |
| (I) By Peak Intensity | 100 | 83 |
| Unit Cell Dimension ($a_o$) | 24.712 | 24.393 |
| Framework Infrared: | | |
| Asymmetric Stretch, $cm^{-1}$ | 1015 | 1061 |
| Symmetric Stretch, $cm^{-1}$ | 787 | 818 |
| Hydroxyl Infrared: | | |
| Absolute Absorbance at 3710 $cm^{-1}$ | — | 0.160 |
| Defect Structure Factor, z | 0.000 | 0.068 |

The framework mole fractions of tetrahedra are set forth below for the starting $NH_4Y$ and the LZ-210 product.

| (a) Mole fraction of framework oxides ($TO_2$): | |
|---|---|
| $NH_4Y$ | $(Al_{0.289}Si_{0.711}\square_0)O_2$ |
| LZ-210 | $(Al_{0.111}Si_{0.821}\square_{0.068})O_2$ |
| (b) Mole fraction of aluminum removed; N | 0.178 |
| (c) % framework aluminum removed; N/a × 100 | 62 |
| (d) Change in defect structure factor; Δz | 0.068 |
| (e) Moles of silicon substituted per mole of aluminum removed; (N-Δz)/N | 0.62 |

In addition to the above described properties, the crystal collapse temperature of the LZ-210 product as measured by the standard DTA procedure was at 1128° C. The untreated $NH_4Y$ crystal collapse temperature measured by the same DTA technique was at 890° C.

EXAMPLE 17

Preparation of LZ-210.

Ten gm. (anhydrous weight) of ammonium zeolite Y ($SiO_2/Al_2O_3$ molar ratio = 4.93) were slurried in 100 ml of 3.4 molar ammonium acetate solution at 75° C. Reagent grade $K_2SiF_6$ (5.32 gm) crystals were added directly to the slurry. The reaction mixture was digested at 75° C. with stirring for two days, after which it was filtered and the filter cake thoroughly washed with hot distilled water until tests of the wash water proved negative for both fluoride and aluminum ions. The X-ray powder pattern obtained on the dried product did not show any extraneous peaks indicative of impurities, precipitated in the zeolite matrix. The chemical and other analyses for the starting $NH_4Y$ zeolite and the LZ-210 product zeolite are set forth below.

|  | $NH_4Y$ | LZ-210 Product |
|---|---|---|
| $Na_2O$ wt. % | 2.5 | 1.2 |
| $(NH_4)_2O$ wt. % | 9.5 | 1.6 |
| $K_2O$ wt. % | — | 5.6 |
| $Al_2O_3$ wt. % | 22.2 | 11.4 |
| $SiO_2$ wt. % | 64.4 | 78.7 |
| $SiO_2/Al_2O_3$ (molar) | 4.93 | 11.72 |
| $Na^+/Al$ | 0.19 | 0.18 |
| $NH_4^+/Al$ | 0.84 | 0.27 |
| $K^+/Al$ | — | 0.53 |
| Cation Equivalent ($M^+/Al$) | 1.03 | 0.98 |
| X-Ray Crystallinity: | | |
| By Peak Intensity | 100 | 44 |
| Unit Cell Dimension ($a_o$) | 24.712 | 24.514 |
| Framework Infrared: | | |
| Asymmetric Stretch, $cm^{-1}$ | 1015 | 1047 |
| Symmetric Stretch, $cm^{-1}$ | 787 | 799 |
| Hydroxyl Infrared: | | |
| Absolute Absorbance at 3710 $cm^{-1}$ | — | 0.210 |
| Defect Structure Factor, z | 0.000 | 0.089 |

The framework mole fractions of tetrahedra are set forth below for the starting $NH_4Y$ and the LZ-210 product.

| (a) Mole fraction of framework oxides ($TO_2$): | |
|---|---|
| $NH_4Y$ | $(Al_{0.289}Si_{0.711}\square_0)O_2$ |
| LZ-210 | $(Al_{0.133}Si_{0.778}\square_{0.089})O_2$ |
| (b) Mole fraction of aluminum removed; N | 0.156 |
| (c) % framework aluminum removed; N/a × 100 | 54 |
| (d) Change in defect structure factor; Δz | 0.089 |
| (e) Moles of silicon substituted per mole of aluminum removed; (N-Δz)/N | 0.43 |

In addition to the above described properties, the crystal collapse temperature of the LZ-210 product as measured by the standard DTA procedure was at 1072° C. The untreated $NH_4Y$ crystal collapse temperature measured by the same DTA technique was at 890° C.

EXAMPLE 18

Ten gm. (anhydrous weight) of ammonium zeolite Y ($SiO_2/Al_2O_3$ ratio = 4.93) were slurried in 100 ml of 3.5 molar ammonium acetate solution at 75° C. A 50 ml solution of water containing 6.63 gm $MgSiF_6.6H_2O$ was added to the slurry in increments of 1 ml, at a rate of 1 ml every 5 minutes. Following addition of the $MgSiF_6$ solution the reaction mixture was digested 17 hours at 75° C., with stirring. After the digestion period, the reaction mixture was filtered and the filter cake thoroughly washed with distilled water until tests of the wash water proved negative for both fluoride and aluminum ions. The X-ray powder pattern obtained on the product showed the presence of a substantial amount of $(NH_4)MgAlF_6$ in the product. The fluoride containing product was Soxhlet extracted with water for 60 hours with the result that a negligible amount of $NH_4MgAlF_6$ was removed from the product. Wet chemical analyses and X-ray powder diffraction both indicated that the product was a mixture of 85% zeolite and 15% $NH_4MgAlF_6$. The chemical and other analyses for the starting $NH_4Y$ zeolite and the LZ-210 product zeolite are set forth below:

| As Prepared: | $NH_4Y$ | LZ-210 Product |
|---|---|---|
| $Na_2O$, wt. % | 2.5 | 0.6 |
| $(NH_4)_2O$, wt. % | 9.5 | 3.2 |
| MgO, wt. % | — | 6.9 |
| $Al_2O_3$, wt. % | 22.2 | 15.2 |
| $SiO_2$, wt. % | 64.4 | 65.6 |
| $SiO_2/Al_2O_3$ (molar) | 4.93 | 7.30 |
| $F_2$, wt. % | none | 9.2 |
| Corrected for 15 wt. % $NH_4MgAlF_6$: | | |
| $SiO_2/Al_2O_3$ | 4.93 | 9.93 |
| Cation Equivalent ($M^+/Al$) | 1.03 | 1.12 |
| X-ray Crystallinity intensity | 100 | 100 |
| Unit Cell Dimension ($a_o$) | 24.712 | 24.454 |
| Framework Infrared: | | |
| Asymmetric Stretch, $cm^{-1}$ | 1015 | 1045 |
| Symmetric Stretch, $cm^{-1}$ | 787 | 811 |
| Hydroxyl Infrared: | | |
| Absolute absorbance @ 3710 $cm^{-1}$ | — | 0.077 |
| Defect Structure Factor, z | 0.000 | 0.033 |

The framework mole fractions of tetrahedra are set forth below for the starting $NH_4Y$ and the LZ-210 product which has been corrected for the presence of 15 wt.% $NH_4MgAlF_6$.

| | |
|---|---|
| (a) Mole fraction of framework oxides $(TO_2)$: | |
| $NH_4Y$ | $(Al_{0.289}Si_{0.711}\square_{0.000})O_2$ |
| LZ-210 | $(Al_{0.161}Si_{0.806}\square_{0.033})O_2$ |
| (b) Mole fraction of aluminum removed; N | 0.128 |
| (c) % framework aluminum removed; N/a × 100 | 44 |
| (d) Change in defect structure factor; $\Delta z$ | 0.033 |
| (e) Moles of silicon substituted per mole of aluminum removed; $(N-\Delta z)/N$ | 0.74 |

EXAMPLE 19

Fluorosilicate Treatment of $NH_4^+$—Omega Zeolite to Produce LZ-213.

(a) A 5.0 gm. sample of Na,TMA—Omega, which had been calcined to remove the tetramethylammonium cations and then ion-exchanged with ammonium cations, was slurried in 100 ml. distilled water heated to 95° C. A second solution of 50 ml containing 1.48 gm $(NH_4)_2SiF_6$ was added to the slurry in 2 ml increments at a rate of 2 ml every 5 minutes. During the course of the fluorosilicate addition, the slurry temperature was maintained at 95° C. The stoichiometric ratio of moles of Si added as $[(NH_4)_2SiF_6]$ to the moles of Al present in the zeolite was 0.55. Following addition of the fluorosilicate solution, the slurry was digested 3 hours at 95° C., then filtered and thoroughly washed until tests of the wash water proved negative for both aluminum and fluoride ions.

The resulting product was only 30% crystalline indicating that the described treatment conditions were too rigorous for the omega structure. No further characterization was obtained with this sample.

(b) A second sample of ammonium-exchanged-calcined TMA Omega zeolite, weighing 1.5 gm, was slurried in 200 ml of 3.4 molar ammonium acetate solution and heated to 75° C. A second solution of 50 ml containing 0.36 gm $(NH_4)_2SiF_6$ in water was added in one ml increments at a rate of one ml every minute. During the course of the fluorosilicate addition, the slurry temperature was maintained at 75° C. The stoichiometric ratio of moles of silicon added as $[(NH_4)_2SiF_6]$ to the moles of aluminum present in the zeolite was 0.5. Following addition of the fluorosilicate, the slurry was digested for 3 hours at 75° C., then filtered and thoroughly washed until tests of the wash water proved negative for both aluminum and fluoride ions. The chemical analyses for the starting $NH_4$-Omega and the product of the fluorosilicate treatment are shown in Table 16A, below:

TABLE 16A

| | Starting $NH_4^+$-Omega | LZ-213 Product |
|---|---|---|
| $Na_2O$, wt. % | — | 0.16 |
| $(NH_4)_2O$, wt. % | 8.26 | 7.93 |
| $Al_2O_3$, wt. % | 19.56 | 18.39 |
| $SiO_2$, wt. % | 71.48 | 72.30 |
| $F_2$, wt. % | — | 0.18 |
| $SiO_2/Al_2O_3$ (molar) | 6.20 | 6.67 |
| $Na^+/Al$ | — | 0.01 |
| $NH_4^+/Al$ | 0.83 | 0.85 |
| Cation Equivalent, $M^+/Al$ | 0.83 | 0.86 |

The comparison of the properties of the treated zeolite with the starting material is shown in Table 16B, below:

TABLE 16B

| | Starting $NH_4^+$-Omega | LZ-213 Product |
|---|---|---|
| X-Ray Crystallinity (I/I.) | 100 | 109 |
| Framework Infrared | | |
| Asymmetric stretch, $cm^{-1}$ | 1040 | 1045 |
| Symmetric stretch, $cm^{-1}$ | 810 | 812 |
| Hydroxyl Infrared | | |
| Absolute Absorbance at 3710 $cm^{-1}$ | 0.039 | 0.061 |
| Defect Structure Factor, z | 0.017 | 0.026 |

The framework mole fractions are set forth below for the starting $NH_4^+$-Omega and the LZ-213 product.

| | |
|---|---|
| (a) Mole Fraction of Oxides $(TO_2)$ | |
| $NH_4^+$-Omega | $(Al_{0.239}Si_{0.744\ 0.017})O_2$ |
| LZ-213 | $(Al_{0.225}Si_{0.749\ 0.026})O_2$ |
| (b) Mole fraction of aluminum removed, N | 0.014 |
| (c) Percent of framework aluminum removed, (N/a) × 100 | 6 |
| (d) Change in Defect Structure Factor, $\Delta z$ | 0.009 |
| (e) Moles of silicon substituted per mole of aluminum removed, $(N-\Delta z)/N$ | 0.36 |

This example is illustrative of a zeolite sample that has been both treated too harshly (high temperature and pH, concentrations) causing excessive crystal degradation, and too mildly such that the dealumination was too slow and silicon substitution could not occur to a substantial level even though the efficiency of silicon substitution was nearly 40%.

The novel zeolite compositions of the present invention are useful in all adsorption, ion-exchange and catalytic processes in which their less siliceous precursors have heretofore been suitably employed. In general, because they are more highly siliceous than their precursors they are not only more thermally and hydrothermally stable than those prior known materials but also have increased resistance toward acidic agents such as mineral and organic acids, $SO_2$, $SO_3$, $NO_x$ and the like. These new zeolites are thus highly useful as selective adsorbents for these materials from, for example, gas streams containing same in contact sulfuric acid plants. Also since their crystal structures are notably low in defect structure and the zeolitic cations are ion-exchangeable for other cation species, both metallic and non-metallic, these zeolite compositions are readily tailored by known methods to suit the requirements of a broad spectrum of catalyst compositions, particularly hydrocarbon conversion catalysts. The non-metallic cation sites can also be thermally decationized in the known manner to produce the highly acidic zeolite forms favored in most hydrocarbon conversion reactions.

The novel zeolites of this invention can be compounded into a porous inorganic matrix such as silica-alumina, silica-magnesia, silica-zirconia, silica-aluminia-thoria, silica-alumina-magnesia and the like. The relative proportions of finely divided zeolite and inorganic matrix can vary widely with the zeolite content ranging from about 1 to 90 percent by weight, preferably from about 2 to about 50 percent by weight.

Among the hydrocarbon conversion reactions catalyzed by these new compositions are cracking, hydrocracking, alkylation of both the aromatic and isoparaffin types, isomerization including xylene isomerization, polymerization, reforming, hydrogenation, dehydrogenation, transalkylation and dealkylation, and catalytic dewaxing.

Using these zeolite catalyst compositions which contain a hydrogenation promoter such as platinum or palladium, heavy petroleum residual stocks, cyclic stocks and other hydrocrackable charge stocks can be hydrocracked at temperatures in the range of 400° F. to 825° F. using molar ratios of hydrogen to hydrocarbon in the range of between 2 and 80, pressures between 10 and 3500 p.s.i.g., and a liquid hourly space velocity (LHSV) of from 0.1 to 20, preferably 1.0 to 10.

The catalyst compositions employed in hydrocracking are also suitable for use in reforming processes in which the hydrocarbon feedstocks contact the catalyst at temperatures of from about 700° F. to 1000° F., hydrogen pressure of from 100 to 500 p.s.i.g., LSHV values in the range of 0.1 to 10 and hydrogen to hydrocarbon molar ratios in the range of 1 to 20, preferably between 4 and 12.

These same catalysts, i.e. those containing hydrogenation promoters, are also useful in hydroisomerization processes in which feedstocks such as normal paraffins are converted to saturated branched chain isomers. Hydroisomerization is carried out at a temperature of from about 200° F. to 600° F., preferably 300° F. to 550° F. with an LHSV value of from about 0.2 to 1.0. Hydrogen is supplied to the reactor in admixture with the hydrocarbon feedstock in molar proportions (H/Hc) of between 1 and 5.

At somewhat higher temperatures, i.e. from about 650° F. to 1000° F., preferably 850° F. to 950° F. and usually at somewhat lower pressures within the range of about 15 to 50 p.s.i.g., the same catalyst compositions are used to hdyroisomerize normal paraffins. Preferably the paraffin feedstock comprises normal paraffins having a carbon number range of $C_7$–$C_{20}$. Contact time between the feedstock and the catalyst is generally relatively short to avoid undesireable side reactions such as olefin polymerization and paraffin cracking. LHSV values in the range of 0.1 to 10, preferably 1.0 to 6.0 are suitable.

The increase in the molar $SiO_2/Al_2O_3$ ratios of the present zeolite compositions favor their use as catalysts in the conversion of alkylaromatic compounds, particularly the catalytic disproportionation of toluene, ethylene, trimethyl benzenes, tetramethylbenzenes and the like. In the disproportionation process isomerization and transalkylation can also occur. Advantageously the catalyst form employed contains less than 1.0 weight percent sodium as $Na_2O$ and is principally in the so-called hydrogen cation or decationized form. Group VIII noble metal adjuvents alone or in conjunction with Group VI-B metals such as tungstem, molybdenum and chromium are preferably included in the catalyst composition in amounts of from about 3 to 15 weight-% of the overall composition. Extraneous hydrogen can, but need not be present in the reaction zone which is maintained at a temperature of from about 400° to 750° F., pressures in the range of 100 to 2000 p.s.i.g. and LHSV values in the range of 0.1 to 15.

Catalytic cracking processes are preferably carried out using those zeolites of this invention which have $SiO_2/Al_2O_3$ molar ratios of 8 to 12, less than 1.0 weight-% $Na_2O$ and feedstocks such as gas oils, heavy naphthas, deasphalted crude oil residua etc. with gasoline being the principal desired product. The decationized form of the zeolite and/or polyvalent metal cationic form are advantageously employed. Temperature conditions of 850° to 1100° F., LHSV values of 0.5 to 10 and pressure conditions of from about 0 to 50 p.s.i.g. are suitable.

Dehydrocyclization reactions employing paraffinic hydrocarbon feedstocks, preferably normal paraffins having more than 6 carbon atoms, to form benzene, xylenes, toluene and the like are carried out using essentially the same reaction conditions as for catalytic cracking. The preferred form of the zeolite employed as the catalyst is that in which the cations are principally metals of Group II-A and/or II-B such as calcium, strontium, magnesium, Group VIII non-noble metal cation can also be employed such as cobalt and nickel.

In catalytic dealkylation wherein it is desired to cleave paraffinic side chains from aromatic nuclei without substantially hydrogenating the ring structure, relatively high temperatures in the range of about 800°–1000° F. are employed at moderate hydrogen pressures of about 300–1000 p.s.i.g., other conditions being similar to those described above for catalytic hydrocracking. Preferred catalysts are of the relatively non-acidic type described above in connection with catalytic dehydrocyclization. Particularly desirable dealkylation reactions contemplated herein include the conversion of methylnaphthalene to naphthalene and toluene and/or xylenes to benzene.

In catalytic hydrofining, the primary objective is to promote the selective hydrodecomposition of organic sulfur and/or nitrogen compounds in the feed, without substantially affecting hydrocarbon molecules therein. For this purpose it is preferred to employ the same general conditions described above for catalytic hydrocracking, and catalysts of the same general nature described in connection with dehydrocyclization operations. Feedstocks include gasoline fractions, kerosenes, jet fuel fractions, diesel fractions, light and heavy gas oils, deasphalted crude oil residua and the like any of which may contain up to about 5 weight-percent of sulfur and up to about 3 weight-percent of nitrogen.

Similar conditions can be employed to effect hydrofining, i.e., denitrogenation and desulfurization, of hydrocarbon feeds containing substantial proportions of organonitrogen and organosulfur compounds. As observed by D. A. Young in U.S. Pat. No. 3,783,123, it is generally recognized that the presence of substantial amounts of such constituents markedly inhibits the activity of catalysts for hydrocracking. Consequently, it is necessary to operate at more extreme conditions when it is desired to obtain the same degree of hydrocracking conversion per pass on a relatively nitrogenous feed than are required with a feed containing less organonitrogen compounds. Consequently, the conditions under which denitrogenation, desulfurization and/or hydrocracking can be most expeditiously accomplished in any given situation are necessarily determined in view of the characteristics of the feedstocks in particular the concentration of organonitrogen compounds in the feedstock. As a result of the effect of organonitrogen compounds on the hydrocracking activity of these compositions it is not at all unlikely that the conditions most suitable for denitrogenation of a given feedstock having a relatively high organonitrogen content with minimal hydrocracking, e.g., less than 20 volume percent of fresh feed per pass, might be the same as those preferred for hydrocracking another feedstock having a lower concentration of hydrocracking inhibiting constituents e.g., organonitrogen compounds. Consequently, it has become the practice in this art to establish the conditions under which a certain feed is to be contacted on the basis of preliminary screening tests with the specific catalyst and feedstocks.

Isomerization reactions are carried out under conditions similar to those described above for reforming, using somewhat more acidic catalysts. Olefins are preferably isomerized at temperatures of 500°–900° F., while paraffins, naphthenes and alkyl aromatics are isomerized at temperatures of 700°–1000° F. Particularly desirable isomerization reactions contemplated herein include the conversion of n-heptane and/or n-octane to isoheptanes, iso-octanes, butane to iso-butane, methylcyclopentane to cyclohexane, meta-xylene and/or ortho-xylene to paraxylene, 1-butene to 2-butene and/or isobutene, n-hexane to isohexene, cyclohexene to methyl-cyclopentene etc. The preferred cation form of the zeolite catalyst is that in which the ion-exchange capacity is about 50–60 percent occupied by polyvalent metals such as Group II-A, Group II-B and rare earth metals, and 5 to 30 percent of the cation sites are either decationized or occupied by hydrogen cations.

For alkylation and dealkylation processes the polyvalent metal cation form of the zeolite catalyst is preferred with less than 10 equivalent percent of the cations being alkali metal. When employed for dealkylation of alkyl aromatics, the temperature is usually at least 350° F. and ranges up to a temperature at which substantial cracking of the feedstock or conversion products occurs, generally up to about 700° F. The temperature is preferably at least 450° F. and not greater than the critical temperature of the compound undergoing dealkylation. Pressure conditions are applied to retain at least the aromatic feed in the liquid state. For alkylation the temperature can be as low as 250° F. but is preferably at least 350° F. In alkylating benzene, toluene and xylene, the preferred alkylating agents are olefins such as ethylene and propylene.

The hydrothermal stability of many of the zeolite compositions of this invention can be enhanced by conventional steaming procedures. In general the ammonium or hydrogen cation forms of the zeolite are contacted with steam at a water vapor pressure of at least about 0.1 psia, preferably at least 0.2 psia up to several atmospheres. Preferably steam at one atmosphere is employed. The steaming temperatures range from 100° C. up to the crystal destruction temperature of the zeolite, but are preferably in the range of 600° C. to 850° C. Steaming periods of a few minutes, e.g. 10 minutes, up to several hours can be employed depending upon the specific temperature conditions. The steaming also produces changes in the selectivity of the catalyst in many cases.

In the above-described catalytic conversion processes the preferred zeolite catalysts are those in which the zeolite constituent has pores of sufficient diameter to adsorb benzene. Such zeolites include LZ-210, LZ-211, LZ-212, LZ-217 and LZ-213

EXAMPLE 20

In order to evaluate the catalytic activity of LZ-210 in the catalytic cracking of a gas oil feedstock, a sample of the catalyst was prepared as follows: 990 g. $(NH_4)_2SiF_6$ were dissolved with stirring into 3.8 liters of distilled water at 50° C. The solution was put into a dropping funnel fitted on a three-necked round-bottom flask. A solution of 1500 grams of ammonium acetate in 10 liters of water was then added to the flask. Ammonium zeolite Y in the amount of 2500 grams (anhydrous weight, molar $SiO_2/Al_2O_3=4.87$) was slurried up in the ammonium acetate solution at 75° C. A mechanical stirred was fitted to the center hole of the flask, which was also fitted with the necessary thermo-couples and temperature controllers. Addition of the 3.8 liters of $(NH_4)_2SiF_6$ solution in 100 ml. increments begun with a 5-minute interval between each addition. The initial pH of the slurry was measured at 5.74 and after all of the $(NH_4)_2SiF_6$ solution was added to the pH of the slurry was 5.38. The mixture was heated at 95° C. with stirring for an additional 18 hours, the dropping funnel having been replaced with a condenser. The stoichiometry of the reaction was of the order of one Si added as $(NH_4)_2SiF_6$ for every two Al atoms present in the zeolite. At the conclusion of the reaction the pH of the slurry was 5.62. The reaction mixture was then filtered and the solids washed with about 25 liters of hot distilled water, until quantitative tests indicated absence of $NH_3$ and aluminum in the effluent wash water. It was then dried 2 hours at 110° C. The product had a unit cell dimension ($a_o$) of 24.41 A, a cation equivalence of 0.94, and the following compositional mole ratios:

$Na_2O/Al_2O_3=0.076$
$(NH_4)_2O/Al_2O_3=0.862$
$SiO_2/Al_2O_3=9.87$

The powdered LZ-210 was admixed with 1.5 times its weight of alumina and formed by means of extrusion into 1/16" pellets. The pellets were calcined at 500° C. for 6 hours. The resulting extrudates were sized to 60–100 mesh and evaluated for cracking actiivty using a gas oil feedstock, (Amoco FHC-893), in accordance with the procedure of ASTM test No. D 032,04. The following results were obtained:

| | |
|---|---|
| ASTM Conversion | 86.0 |
| Gas[1] | 35.0 |
| Gasoline[2] | 28.5 |
| Coke[3] | 8.89 |
| $H_2$ | 0.14 |
| $C_1$ | 0.38 |
| $C_2 + C_2=$ | 1.3 |
| $C_3$ | 2.5 |
| $C_3=$ | 2.6 |
| $i\text{-}C_4$ | 6.5 |
| $n\text{-}C_4$ | 3.2 |
| $C_4=$ | 10.8 |
| $C_5$ | 5.1 |
| $C_5$ | 2.5 |

[1] weight % feed converted to gas
[2] Gasoline - wt. product (180° F.-421° F.)/Total product
[3] Weight % feed converted to coke (gravimetric)

EXAMPLE 21

A sample of LZ-210 having a $SiO_2/Al_2O_3$ molar ratio of 9.6 and containing 0.7 weight % $Na_2O$ was loaded with 0.53 weight percent palladium and composited with sufficient alumina to form an 80% Pd/LZ-210—20% $Al_2O_3$ catalyst composition having an average bulk density of 0.48 cc./g. This catalyst composition was tested for gasoline hydrocracking performance using the following test conditions:
Feedstock—Gas Oil, °API—39.0, BP.R=316°-789° F.
Pressure—1450 psig.
$H_2/Oil=8000$ SCF/BBL.
To determine the second stage hydrogenation activity of the catalyst, the feed was doped with 5000 ppm sulfur as throphene. The activity in this regard was, in terms of the temperature required to obtain a 49.0 °API product after 100 hours in stream, 498° F. To determine the first stage (cracking) activity, the feed was doped with 5000 ppm sulfur as thiophene and 2000 ppm nitrogen as 5-butylamine. The activity in this regard, in terms of the temperature required to obtain a 47.0 °API product after 100 hours on stream, was 692° F.

The entire disclosure of our application Ser. No. 66,330, filed Aug. 14, 1979 is incorporated herein by reference.

What is claimed is:

1. Crystalline zeolite aluminosilicate having extraneous silicon atoms in its crystal lattice in the form of framework $SiO_4$ tetrahedra, and having in the dehydrated state a chemical composition expressed in terms of mole ratios of oxides $$0.9 \pm 0.1 M_{2/n}O : Al_2O_3 : xSiO_2$$

wherein "M" is a cation having the valence of "n" and wherein said aluminosilicate has a combination of X-ray powder diffraction pattern and a value for "x" selected from the group consisting of:
(i) a value for "x" of greater than 8 and an X-ray powder diffraction pattern having at least the d-spacings set forth in Table G or Table H or Table K or Table I; and
(ii) a value for "x" of greater than 7, and an X-ray powder diffraction pattern having at least the d-spacings set forth in Table D; and
(iii) a value for "x" of greater than 11, and an X-ray powder diffraction pattern having at least the d-spacings set forth in Table J; and
(iv) a value for "x" of greater than 20, and an X-ray powder diffraction pattern having at least the d-spacings set forth in Table L.

2. A crystalline aluminosilicate having at least some of its original framework aluminum atoms replaced by extraneous silicon atoms and having the chemical composition $$[Al_{(a-N)}Si_{b+(N-\Delta z)}\square_z]O_2$$

wherein $Al_{(a-N)}$ represents the mole fraction of aluminum tetrahedra in the product zeolite; "a" represents the mole fraction of aluminum tetrahedra in the original zeolite; "N" represents the mole fraction of aluminum tetrahedra removed from the original zeolite, and has a value of at least 0.3a; $Si_{b+(N-\Delta z)}$ represents the mole fraction of silicon tetrahedra in the product zeolite; "b" represents the mole fraction of silicon tetrahedra in the original zeolite; $(N-\Delta z)$ represents the mole fraction of silicon tetrahedra resulting from the substitution of extraneous silicon into the crystal lattice; "$\square$" represents the framework defect sites; "z" represents the mole fraction of framework defect sites; $\Delta "z"$ represents the difference between the mole fraction of framework defect sites of the original zeolite and the zeolite containing the extraneous silicon atoms and has a value of less than 0.08; $(N-\Delta z)/N$ has a value at least as great as 0.5, and possesses a combination of X-ray powder diffraction patterns and a value for the term $[b+(N-\Delta z)]/(a-N)$ selected from the group of such combinations consisting of
(i) an X-ray powder diffraction pattern having at least the d-spacings set forth in Table J and a value for $[b+(N-\Delta z)]/(a-N)$ of at least 5.5; and
(ii) an X-ray powder diffraction pattern having at least the d-spacings set forth in Table L and a value for $[b+(N-\Delta z)]/(a-N)$ of at least greater than 10; and
(iii) an X-ray powder diffraction pattern having at least the d-spacings set forth in Table D and a value for $[b+(N-\Delta z)]/(a-N)$ of at least 4.0; and
(iv) an X-ray powder diffraction pattern having at least the d-spacings set forth in Table G and a value for $[b+(N-\Delta z)]/(a-N)$ of at least 4.0; and
(v) an X-ray powder diffraction pattern having at least the d-spacings set forth in Table H and a value for $[b+(N-\Delta z)]/(a-N)$ of at least 4.0; and
(vi) an X-ray powder diffraction pattern having at least the d-spacings set forth in Table I and a value for $[b+(N-\Delta z)]/(a-N)$ of at least 4.0; and
(vii) an X-ray powder diffraction pattern having at least the d-spacings set forth in Table K and a value for $[b+(N-\Delta z)]/(a-N)$ of at least 4.0.

3. Crystalline aluminosilicate according to claim 2 wherein the value of $\Delta z$ is less than 0.05.

4. Crystalline aluminosilicate composition according to claim 1 wherein "x" has a value of from 8 to 120, the extraneous silicon atoms are present in an amount of at least 1.0 per 10,000 $Å^3$, and the aluminosilicate has an X-ray powder diffraction pattern having at least the d-spacings set forth in Table D.

5. Crystalline aluminosilicate composition according to claim 1 wherein "x" has a value of from 8 to 60, the extraneous silicon atoms are present in an amount of at least 1.0 per 10,000 $Å^3$, and the aluminosilicate has an X-ray powder diffraction pattern having at least the d-spacings set forth in Table G.

6. Crystalline aluminosilicate composition according to claim 1 wherein "x" has a value of from 8 to 20, the extraneous silicon atoms are present in an amount of at least 1.0 per 10,000 $Å^3$, and the aluminosilicate has an X-ray powder diffraction pattern having at least the d-spacings set forth in Table I.

7. Crystalline aluminosilicate composition according to claim 1 wherein the extraneous silicon atoms are present in an amount of at least 1.0 per 10,000 $Å^3$, and the aluminosilicate has an X-ray powder diffraction pattern having at least the d-spacings set forth in Table H.

8. Crystalline aluminosilicate composition according to claim 1 wherein "x" has a value of from 12 to 20, the extraneous silicon atoms are present in an amount of at least 1.0 per 10,000 $Å^3$, and the aluminosilicate has an X-ray powder diffraction pattern having at least the d-spacings set forth in Table J.

9. Crystalline aluminosilicate composition according to claim 1 wherein "x" has a value of from 8 to 20, the extraneous silicon atoms are present in an amount of at least 1.0 per 10,000 $Å^3$, and the aluminosilicate has an X-ray powder diffraction pattern having at least the d-spacings set forth in Table K.

10. Crystalline aluminosilicate composition according to claim 1 wherein "x" has a value of from 22 to 60, the extraneous silicon atoms are present in an amount of at least 1.0 per 10,000 $Å^3$, and the aluminosilicate has an X-ray powder diffraction pattern having at least the d-spacings set forth in Table L.

* * * * *